US008564239B2

(12) United States Patent
Haruyama

(10) Patent No.: US 8,564,239 B2
(45) Date of Patent: Oct. 22, 2013

(54) MEDIUM DETECTION DEVICE AND IMAGE FORMATION APPARATUS

(75) Inventor: Masahiro Haruyama, Tokyo (JP)

(73) Assignee: Oki Data Corporation, Tokyo (JP)

( * ) Notice: Subject to any disclaimer, the term of this patent is extended or adjusted under 35 U.S.C. 154(b) by 213 days.

(21) Appl. No.: 13/183,697

(22) Filed: Jul. 15, 2011

(65) Prior Publication Data

US 2012/0027425 A1 Feb. 2, 2012

(30) Foreign Application Priority Data

Jul. 27, 2010 (JP) ................................ 2010-167841

(51) Int. Cl.
*G05B 1/06* (2006.01)

(52) U.S. Cl.
USPC ............ 318/640; 358/400; 358/498; 399/13; 318/560; 318/561

(58) Field of Classification Search
USPC ............... 318/560, 561, 640; 271/10.03, 111, 271/227; 358/498, 449, 400; 399/13
See application file for complete search history.

(56) References Cited

U.S. PATENT DOCUMENTS 4,881,840 A * 11/1989 Rendon et al. ............. 400/705.1
5,453,852 A * 9/1995 Morikawa et al. ............ 358/498
5,491,567 A * 2/1996 Morikawa et al. ............ 358/498
5,493,417 A * 2/1996 Morikawa et al. ............ 358/449
5,493,422 A * 2/1996 Morikawa et al. ............ 358/474
5,504,587 A * 4/1996 Morikawa et al. ............ 358/400
5,510,909 A * 4/1996 Morikawa et al. ............ 358/498
5,537,219 A * 7/1996 Morikawa et al. ............ 358/406
5,537,225 A * 7/1996 Morikawa et al. ............ 358/475
5,606,430 A * 2/1997 Morikawa et al. ............ 358/498
5,671,917 A * 9/1997 Choho et al. .................. 271/111
5,833,227 A * 11/1998 Choho et al. ............... 271/10.03
6,126,347 A * 10/2000 Sakaino et al. ............... 400/642
7,055,949 B2 * 6/2006 Ohashi .......................... 347/104
7,063,473 B2 * 6/2006 Ohashi et al. ................. 400/642
7,151,717 B2 * 12/2006 Sugiyama .................. 369/30.07
7,192,207 B2 * 3/2007 Ohashi et al. ................. 400/188
7,222,955 B2 * 5/2007 Ohashi et al. ................. 347/104
7,242,874 B2 * 7/2007 Tsusaka .......................... 399/13
8,328,191 B2 * 12/2012 Tamura et al. ........... 271/265.01
2004/0207707 A1 * 10/2004 Ohashi et al. ................. 347/104
2004/0207708 A1 * 10/2004 Ohashi et al. ................. 347/104
2004/0263599 A1 * 12/2004 Sugiyama ..................... 347/101
2005/0012800 A1 * 1/2005 Ohashi .......................... 347/104
2005/0058480 A1 * 3/2005 Ohashi et al. ................... 400/55
2005/0220461 A1 * 10/2005 Tsusaka .......................... 399/13
2011/0187049 A1 * 8/2011 Tamura et al. ................ 271/227

FOREIGN PATENT DOCUMENTS

JP 2008-150149 A 7/2008

* cited by examiner

*Primary Examiner* — Paul Ip
(74) *Attorney, Agent, or Firm* — Marvin A. Motsenbocker; Mots Law, PLLC

(57) ABSTRACT

A medium detection device includes: a sensor lever configured to rotate corresponding to a travel of a recording medium; a sensor configured to detect the rotation of the sensor lever; a stopper having a guide surface inclined with respect to the movement direction of the sensor lever and configured to stop movement of the sensor lever upon the rotation of the sensor.

22 Claims, 21 Drawing Sheets

FIRST EMBODIMENT

FIRST EMBODIMENT

COMPARISON EXAMPLE

FIG. 9 COMPARISON EXAMPLE

COMPARISON EXAMPLE

MODIFICATION 1

MODIFICATION 2

SECOND EMBODIMENT

MEDIUM DETECTION DEVICE AND IMAGE FORMATION APPARATUS

CROSS REFERENCE TO RELATED APPLICATIONS

This application claims priority based on 35 USC 119 from prior Japanese Patent Application No. 2010-167841 filed on Jul. 27, 2010, entitled "MEDIUM DETECTION DEVICE AND IMAGE FORMATION APPARATUS", the entire contents of which are incorporated herein by reference.

BACKGROUND OF THE INVENTION

1. Field of the Invention

The invention relates to a medium detection device and an image formation apparatus, such as a copy machine, a printer, a facsimile machine, or the like, having the same.

2. Description of Related Art

A conventional image formation apparatus such as a copy machine, a printer, a facsimile machine, or the like has a medium detection device provided at a predetermined position in a medium conveyance path and configured, when a recording medium such as paper is conveyed, to detect timing when the recording medium passes.

The image formation apparatus detects the time when the recording medium passes by using the medium detection device thereby detecting a delay of conveyance of the recording medium, an overlapped feed of the recording media, a medium jam, or the like. While monitoring the conveyance status of the recording medium in the apparatus, the image formation apparatus controls the entire image formation operation.

The medium detection device includes a rotatable sensor lever. When a recording medium reaches the medium detection device, the recording medium pushes the sensor lever to rotate about the rotational axis thereof. When the recording medium is passing therethrough, the sensor lever is rotated by the recording medium so that a detection area of an optical sensor such as a photo sensor is uncovered by the sensor lever turning the optical sensor into a light transmitting state. After the recording medium has passed therethrough, the sensor lever is returned to an initial position by weight of the sensor lever or a biasing force of a bias member such as a spring, covering the detection area of the optical sensor, thereby returning the optical sensor to a light blocking state.

An art relating to such a medium detection device is disclosed in Japanese Patent Application Laid-Open No. 2008-150149, for example.

SUMMARY OF THE INVENTION

In the conventional medium detection device, however, a false detection of the medium is likely to occur.

An object of an aspect of the invention is to reduce false detection.

A first aspect of the invention is a medium detection device including: a sensor lever configured to rotate corresponding to travel of a recording medium; a sensor configured to detect the rotation of the sensor lever; a support member rotatably supporting the sensor lever; a stopper provided at the support member and configured to stop movement of the sensor lever upon rotation of the sensor; and a guide surface provided at the stopper and inclined with respect to the movement direction of the sensor lever.

A second aspect of the invention is an image formation apparatus including: the medium detection device according to the first aspect; and an image formation section configured to form an image on the recording medium.

According to the first aspect, the device is provided with the guide surface to guide a repulsive force upon collision of the sensor lever against the stopper into a direction different from the rotation direction of the sensor lever (that is, the travel direction of the recording medium). This reduces part of the repulsion force along the rotation direction of the sensor lever, thereby suppressing occurrence of chattering of the sensor. Therefore, the device can properly detect the leading edge of the following recording medium.

According to the second aspect, the image formation apparatus is configured having the medium detection device according to the first aspect. Accordingly, the occurrence of chattering of the sensor is suppressed. This may lead to a shortened distance between the traveling recording media, thereby improving the printing speed of the image formation apparatus.

DETAILED DESCRIPTION OF THE EMBODIMENTS

Figure 1:
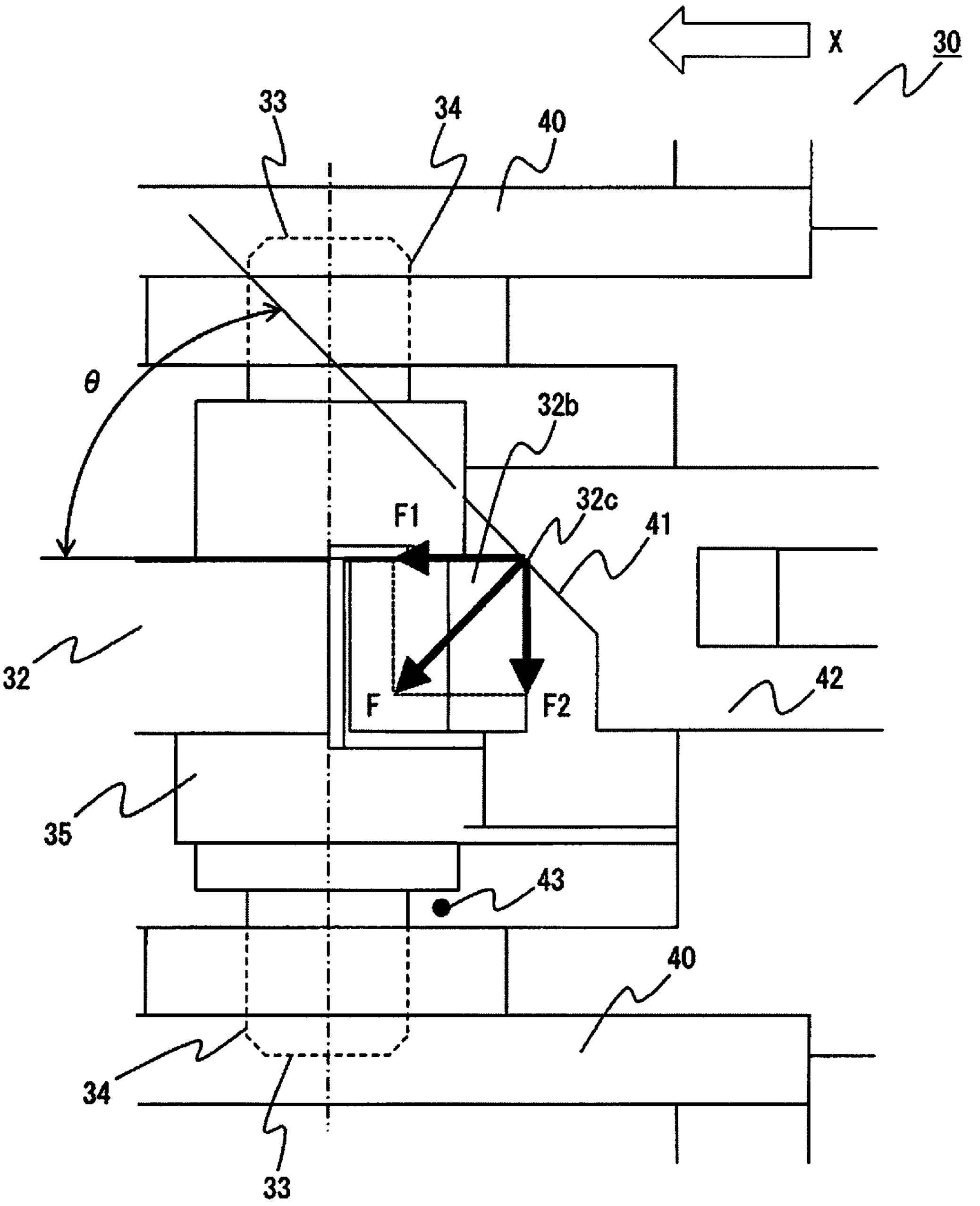
FIG. 1 is a plan view illustrating the medium detection device shown in FIG. 2 according to a first embodiment of the invention.

Descriptions are provided herein below for embodiments based on the drawings. In the respective drawings referenced herein, the same constituents are designated by the same reference numerals and duplicate explanation concerning the same constituents is omitted. All of the drawings are provided to illustrate the respective examples only.

First Embodiment

Configuration of the First Embodiment

Figure 2:
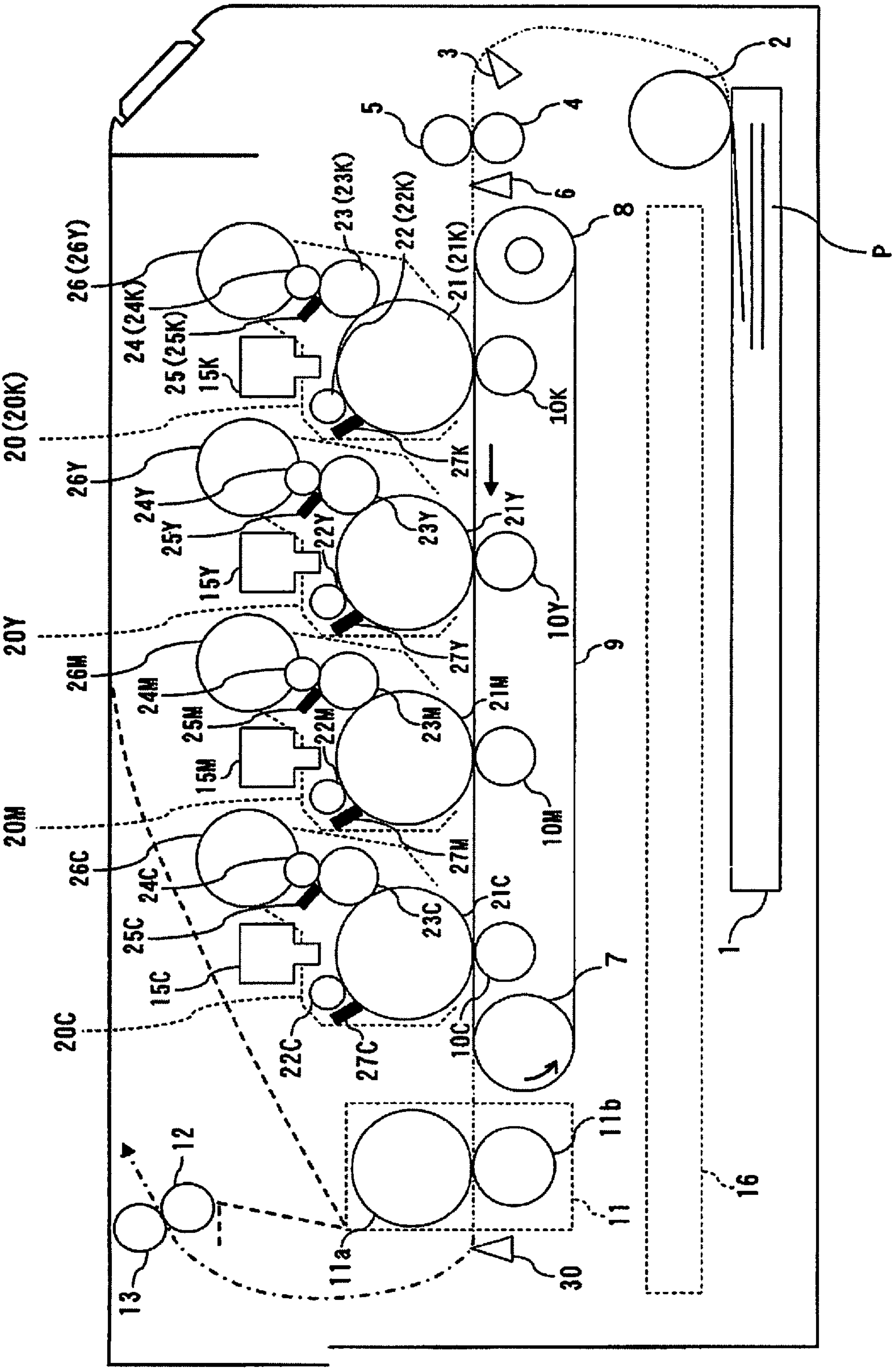
FIG. 2 is a configuration diagram schematically illustrating an image formation apparatus according to the first embodiment of the invention.

FIG. 2 is a configuration diagram illustrating the outline of an image formation apparatus according to the first embodiment of the invention.

The image formation apparatus includes, at about the center in the housing thereof, image formation unit 20 (20K, 20Y, 20M, 20C) for each color of black (k), yellow (y), magenta (m), and cyan (c). Conveyance belt 9 configured to convey recording medium P at a predetermined time is provided under image formation units 20. Conveyance belt 9 is an endless belt to convey recording medium P that is placed thereon. Belt driving roller 7 to drive conveyance belt 9 and driven roller 8 to be rotationally driven by the rotation of belt driving roller 7 are provided at both ends of conveyance belt 9.

Image transfer rollers 10 (10K, 10Y, 10M, 10C) are provided beneath image formation units 20 such that conveyance belt 9 is sandwiched between image transfer rollers 10 (10K, 10Y, 10M, 10C) and image formation units 20.

Provided beneath conveyance belt 9 are: sheet cassette 1 to contain therein sheets of recording media P; and feed roller 2 to sequentially feed out recording medium P from sheet cassette 1 with a separation tongue or the like. Provided downstream of feed roller 2 in a conveyance direction of recording medium P are: inlet sensor 3 to detect approach of recording medium P to conveyance belt 9; conveyance rollers 4 and 5 to feed recording medium P to conveyance belt 9; and write sensor 6 to detect a time of writing (forming) an image onto recording medium P.

Fixation unit 11 is provided downstream of conveyance belt 9. Fixation unit 11 includes a heating element such as a halogen lamp or the like and is configured to fix an image of toner or developer to recording medium P by heating and pressing recording medium P. Fixation unit 11 includes fixation roller 11*a* and fixation backup roller 11*b*.

Provided downstream of fixation unit 11 are: medium detection device 30 or a discharge sensor to detect a recording medium that has passed through fixation unit 11; and discharge rollers 12 and 13 to discharge recording medium P out of the apparatus. Feed roller 2, conveyance roller 4, conveyance roller 5, conveyance belt 9, fixation unit 11, discharge roller 12, and discharge roller 13 constitute a medium conveyance mechanism. Out of the components of the medium conveyance mechanism, fixation unit 11 which is provided upstream of medium detection device 30 serves as a first medium conveyance unit and discharge rollers 12 and 13 which are provided downstream of medium detection device 30 serve as a second medium conveyance unit.

Each image formation unit 20, for printing each color of black (K), yellow (Y), magenta (M), cyan (C), includes photosensitive drum 21 (21K, 21Y, 21M, 21C), charging roller 22 (22K, 22Y, 22M, 22C), development roller 23 (23K, 23Y, 23M, 23C), toner-supplying sponge roller 24 (24K, 24Y, 24M, 24C), development blade 25 (25K, 25Y, 25M, 25C), toner tank 26 (26K, 26Y, 26M, 26C), and cleaning device 27 (27K, 27Y, 27M, 27C).

Provided above each photosensitive drum 21 is light emitting diode (hereinafter, referred to as "LED") head 15 (15K, 15Y, 15M, 15C) or an exposure device to emit light thereby forming an electrostatic latent image on photosensitive drum 21.

Each photosensitive drum 21 functions to carry thereon an electrostatic latent image and carry thereon a toner image (a developer image), which is developed (visualized) by supplying unillustrated toner (developer) to the electrostatic latent image. Charging roller 22 is configured to charge the surface of photosensitive drum 21. LED head 15 is configured to form an electrostatic latent image on the charged surface of photosensitive drum 21. Development roller 23 functions to supply toner to photosensitive drum 21 thereby rendering visible the electrostatic latent image formed on the charged surface of photosensitive drum 21, resulting in forming of a toner image.

Toner-supplying sponge roller 24 functions to supply development roller 23 with toner that is supplied from toner tank 26. Development blade 25 functions to form a toner layer of a constant thickness on development roller 23. Cleaning device 27 functions to remove toner from photosensitive drum 21 by scraping the toner from photosensitive drum 21.

Figure 3:
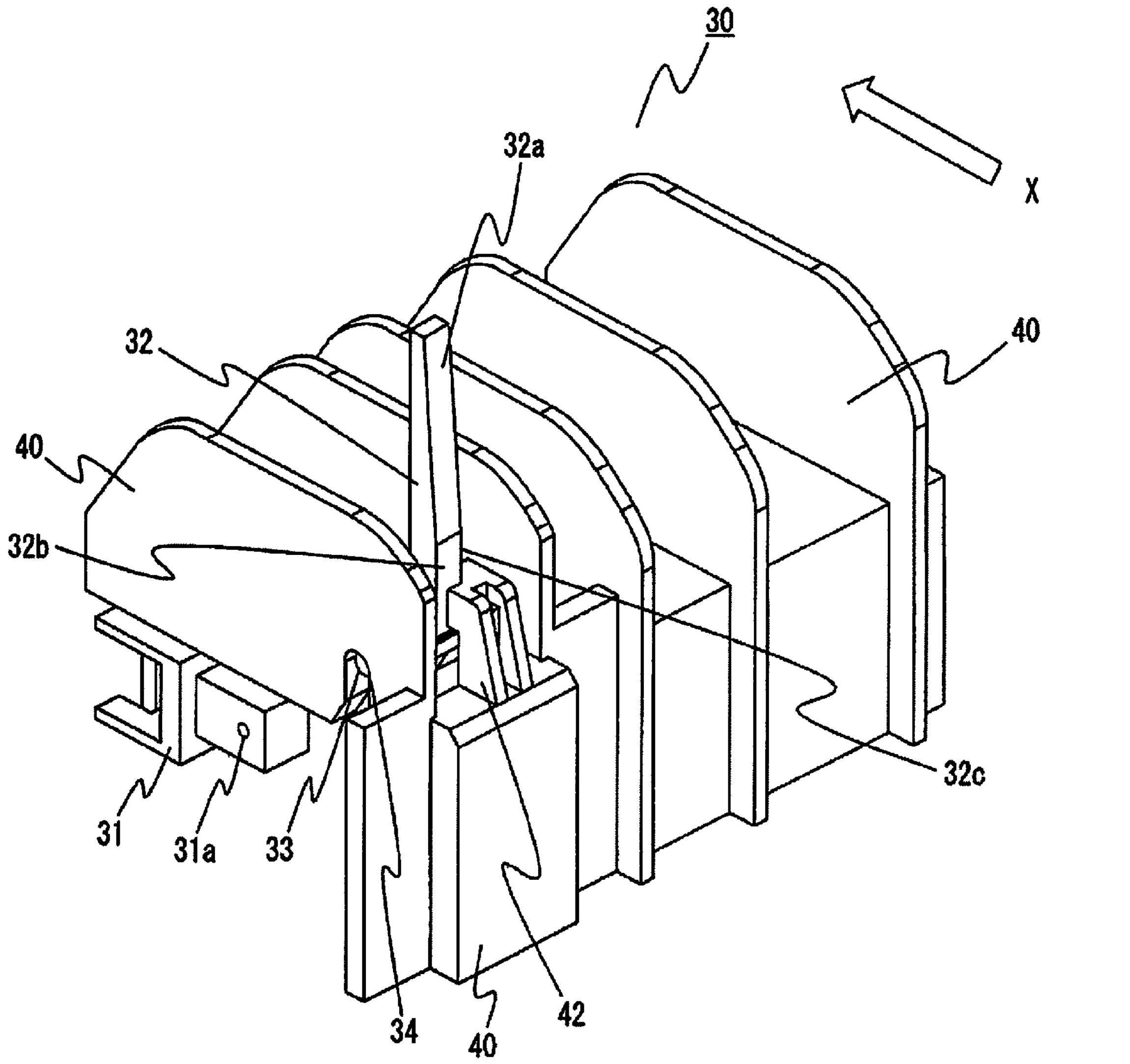
FIG. 3 is a perspective view illustrating the entire medium detection device shown in FIG. 2.

FIG. 3 is a perspective view illustrating the entire medium detection device shown in FIG. 2.

Medium detection device 30 is, for example, a discharge sensor. Medium detection device 30 includes: sensor 31 having light receiving section 31*a*; sensor lever 32; support member 40; and stopper 42 provided at support member 40. Sensor lever 32 is formed with medium contact section 32*a* to contact with the leading edge of recording medium P that moves in a travel direction X of recording medium P and to guide surface contact section 32*b* to contact with stopper 42. The position of sensor lever 32 around guide surface contact section 32*b* is substantially a cuboid and has ridge line 32*c*.

Support member 40 is formed with rotational shaft support 34 in which rotational shaft 33 of sensor lever 32 is fit such that sensor lever 32 is attached to support member 40.

Figure 4:
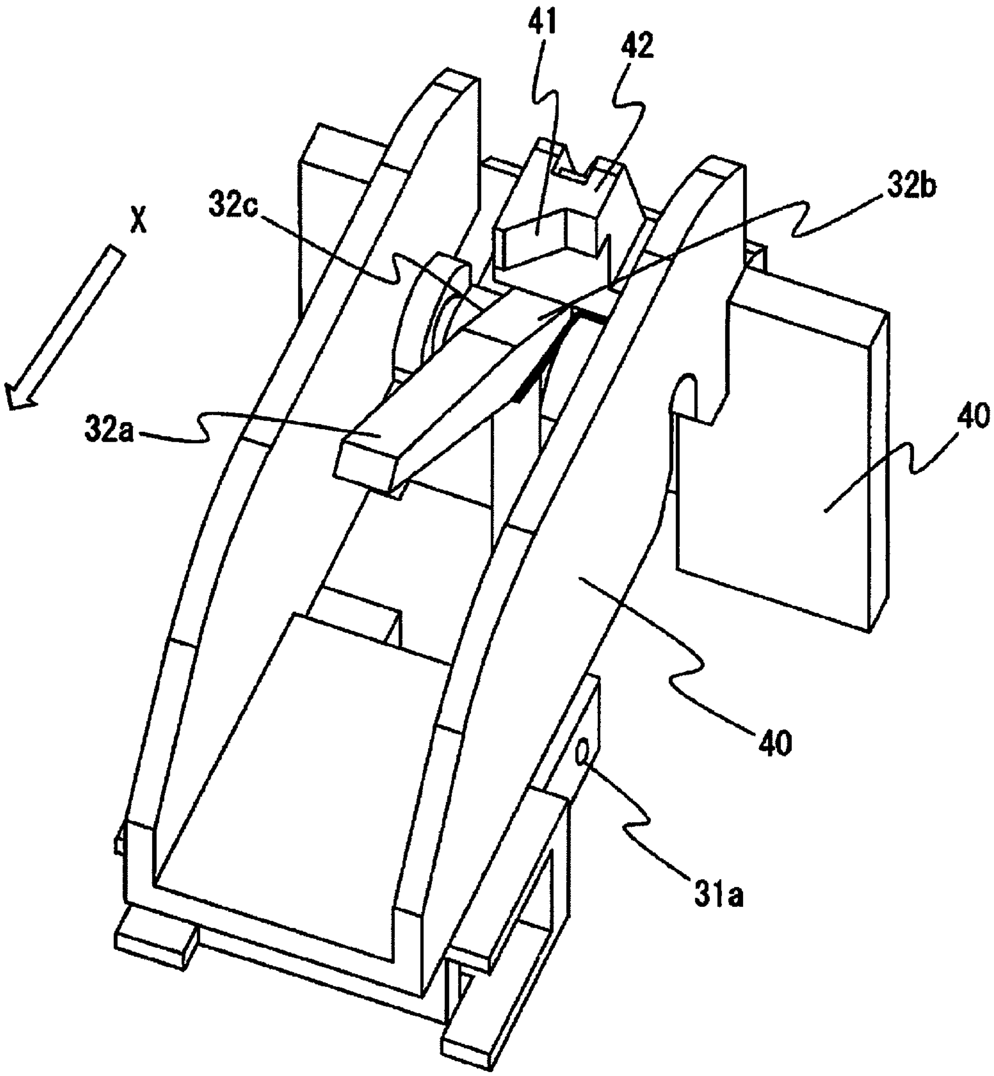
FIG. 4 is a perspective view illustrating a part of the medium detection device shown in FIG. 3.

FIG. 4 is a perspective view illustrating a part of the medium detection device shown in FIG. 3. As shown in FIG. 4, stopper 42 is formed with guide surface 41 which is inclined with respect to travel direction X of recording medium P. Guide surface 41 functions to regulate the rotation of sensor lever 32 in a direction opposite to travel direction X of recording medium P by coming in contact with guide surface contact section 32*b* of sensor lever 32. Note that, since guide surface 41 is inclined with respect to guide surface contact section 32*b*, guide surface 41 functions to guide a repulsive force when guide surface contact section 32*b* collides with guide surface 41 into a direction that is different from the rotation direction of sensor lever 32 (that is, travel direction X of recording medium P).

Figure 5:
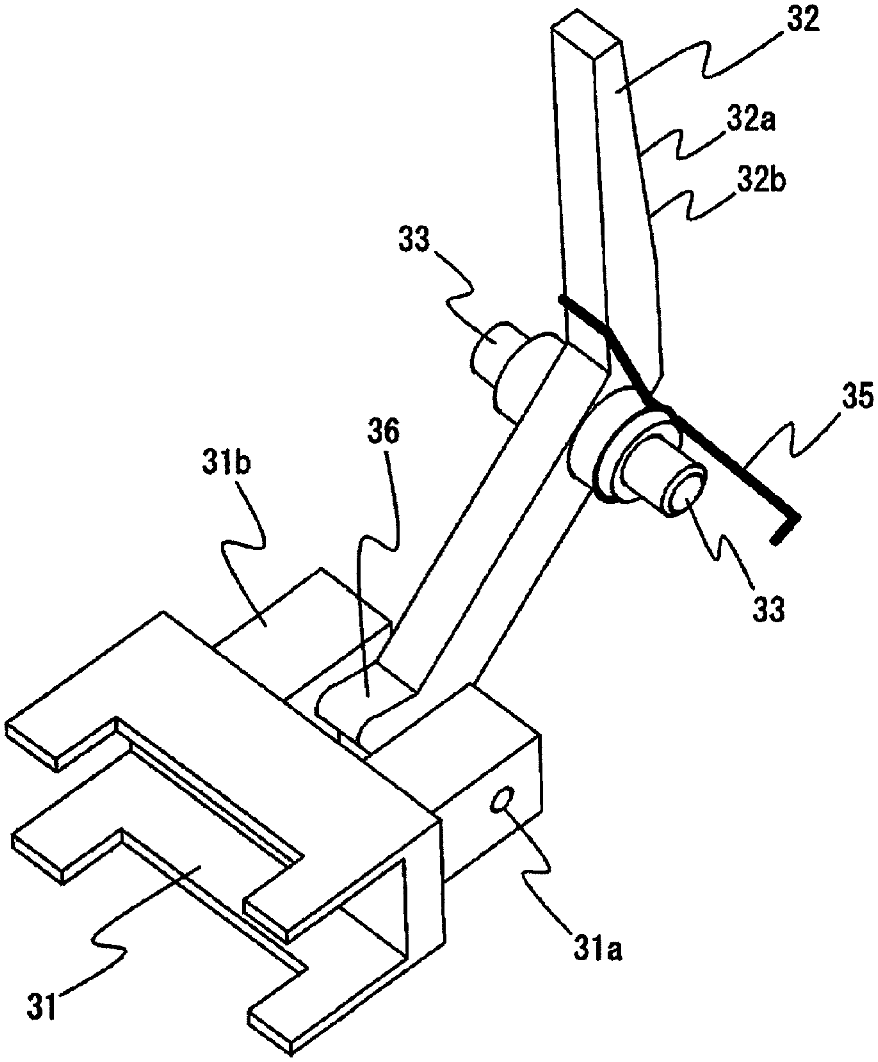
FIG. 5 is a perspective view illustrating a part of the medium detection device shown in FIG. 4.

FIG. 5 is a perspective view illustrating a part of the medium detection device shown in FIG. 4.

As shown in FIG. 5, sensor 31 is provided with light emitting section 31*b* to be driven by a driving current and to output an outgoing beam by emitting light. Light receiving section 31*a* is provided at a location facing light emitting section 31*b*. Sensor 31 is attached to and supported by sensor support 44

(not shown in FIG. 5) formed at support member 40. Torsion spring 35, serving as a bias member, is wound around rotational shaft 33 of sensor lever 32 and functions to bias sensor lever 32 toward the direction opposite to travel direction X of recording medium P.

Sensor lever 32 has a first portion extending in an upward direction substantially orthogonal to travel direction X. The first portion is provided with guide surface contact section 32*b* and medium contact section 32*a*. Sensor lever 32 has a second portion extending to an opposite side of the first portion across rotational shaft 33. The end of the second portion is provided as light blocking part 36 to block the output light.

Note that the rotation of sensor lever 32 is limited by guide surface 41 of stopper 42. When the sensor lever 32 is in contact with guide surface 41 of guide surface contact section 32*b*, light blocking part 36 is located at a detection area between light receiving section 31*a* and light emitting section 31*b*, thereby blocking the output light of sensor 31. When sensor lever 32 receives a force from recording medium P in travel direction X of recording medium P and is thus rotated in a counterclockwise direction, light blocking part 36 is rotationally moved out of the detection area, thereby not blocking the output light of sensor 31.

FIG. 1 is a plan view illustrating the medium detection device shown in FIG. 2 according to the first embodiment of the invention.

Stopper 42 is formed with guide surface 41 tilted at angle θ with respect to travel direction X of recording medium P. Sensor lever 32 is rotatably supported by rotational shaft support 34 and biased by torsion spring 35 in the direction opposite to travel direction X such that ridge line 32*c* of guide surface contact section 32*b* is in contact with guide surface 41. There is gap 43 between torsion spring 35 and support member 40.

When sensor lever 32 rotates in the direction opposite to travel direction X and then collides with stopper 42, ridge line 32*c* collides with guide surface 41, creating repulsion force F in a direction orthogonal to guide surface 41 (that is, the normal direction of guide surface 41). Such repulsion force F is resolved into component force F1 in travel direction X and component force F2 in a direction orthogonal to travel direction X.

Figure 6:
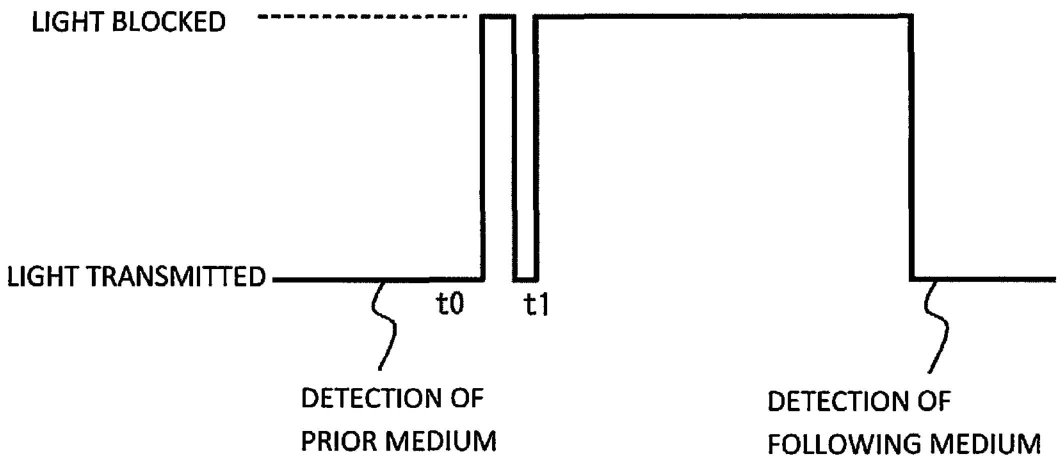
FIG. 6 is a schematic view illustrating a sensor waveform of the medium detection device shown in FIG. 3.

FIG. 6 is a schematic view illustrating a sensor waveform of the medium detection device shown in FIG. 3. In FIG. 6 illustrating the sensor waveform, the horizontal axis indicates time and the vertical axis indicates the state of light received signal.

Figure 7:
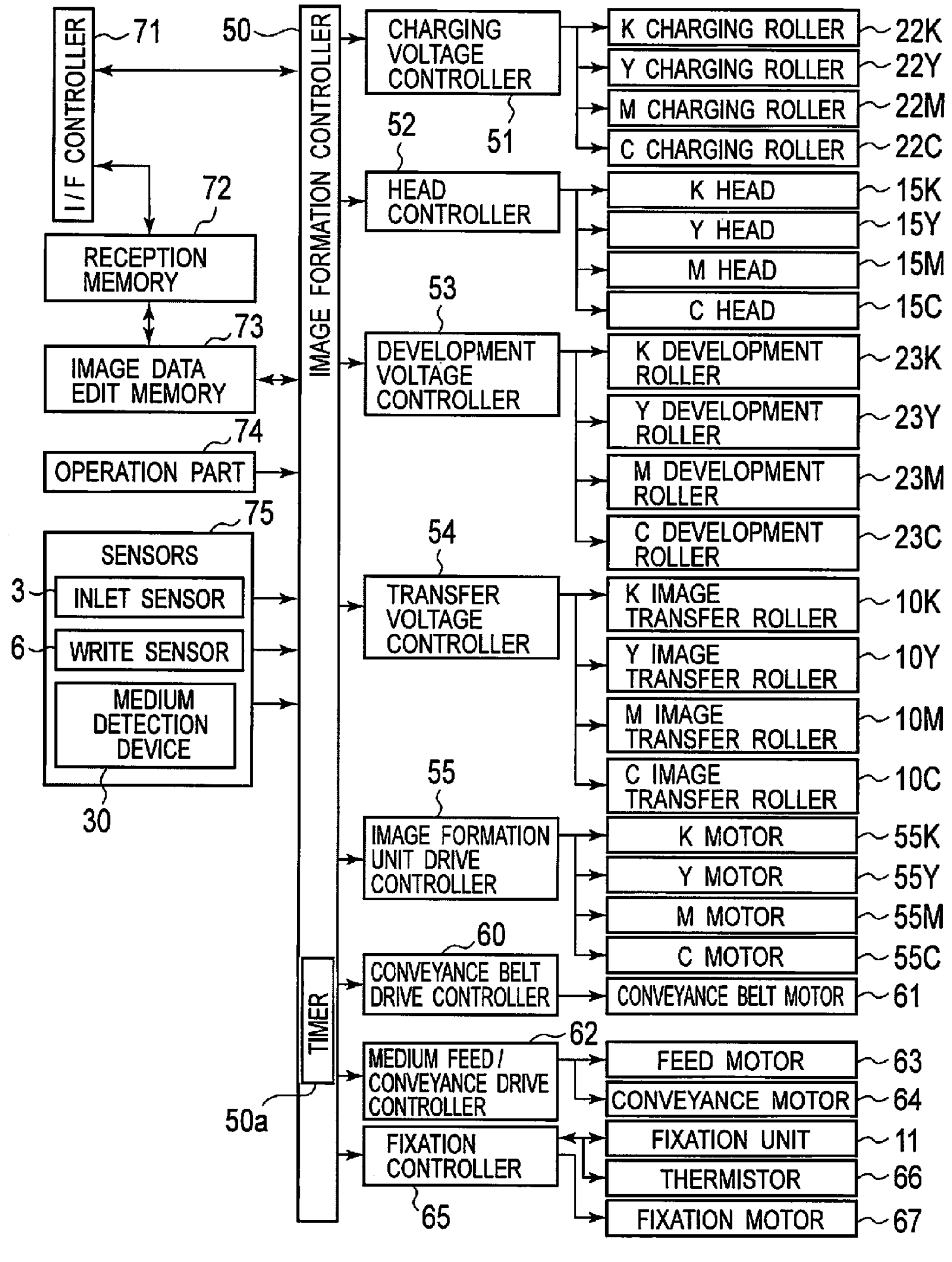
FIG. 7 is a functional block diagram illustrating the configuration of the image formation apparatus shown in FIG. 2.

FIG. 7 is a functional block diagram illustrating the configuration of the image formation apparatus shown in FIG. 2.

The image formation apparatus includes image formation controller 50 comprising a microprocessor, a read-only memory (hereinafter, referred to as "ROM"), a random access memory, an input/output port(s), timer 50*a*, etc. Image formation controller 50 controls the entire image formation apparatus by executing various programs stored in ROM. For example, image formation controller 50 executes the printing operation, by receiving print data and a control command(s) from an external apparatus (or a host computer) and executing a sequence control of the entire image formation apparatus.

Interface controller 71 (hereinafter referred to as I/F controller) functions to transmit various information about the image formation apparatus to an external apparatus and functions to analyze commands received from the external apparatus, process received data, and store the processed data for each color in reception memory 72.

Operation part 74 includes various lamps and displays to display the status of the image formation apparatus, and switches or buttons to input various instructions to the image formation apparatus by the user. Various sensors 75 include: inlet sensor 3 to detect approach of recording medium P to conveyance belt 9; write sensor 6 to detect the timing of writing an image to recording medium P; and medium detection device 30 (or a discharge sensor) to detect discharging of recording medium P from fixation unit 11. Output signals of such sensors is input to image formation controller 50.

Image data edit memory 73 is a memory to edit print data input from the external apparatus via I/F controller 71 to form image data. Image data edit memory 73 is the memory to receive the print data temporally stored in reception memory 72 and to store the image data that is edited for being transmitted to LED head 15.

Charging voltage controller 51 functions to control application of voltage to charging roller 22 to charge the surface of photosensitive drum 21, based on an instruction from image formation controller 50. Head controller 52 functions to control the exposure process of LED head 15 to expose the surface of photosensitive drum 21 in accordance with the image data stored in image data edit memory 73

Development voltage controller 53 functions to control application of voltage to development roller 23 to attach toner to an electrostatic latent image on the surface of photosensitive drum 21 formed by LED head 15. Transfer voltage controller 54 is configured to control application of voltage to image transfer rollers 10 to transfer a toner image formed on the surface of photosensitive drum 21 to recording medium P, in response to an instruction from image formation controller 50.

Image formation unit drive controller 55 is configured to control rotations of photosensitive drum 21, charging roller 22, and development roller 23 in image formation unit 20 (20K, 20Y, 20M, and 20C) of each color. Specifically, image formation unit drive controller 55 controls, based on an instruction from image formation controller 50, a motor (K-motor 55K, Y-motor 55Y, M-motor 55M, and C-motor 55C) of image formation unit 20 (20K, 20Y, 20M, and 20C) of each color so as to control rotations of photosensitive drum 21, charging roller 22, and development roller 23 in each image formation unit 20 (20K, 20Y, 20M, and 20C).

Conveyance belt drive controller 60 is configured to control drive of conveyance belt 9 to convey recording medium P. Specifically, conveyance belt drive controller 60 functions, based on an instruction from image formation controller 50, to control conveyance belt motor 61.

Medium feed/conveyance drive controller 62 is configured to feed and convey recording medium P to a position of conveyance belt 9. Specifically, Medium feed/conveyance drive controller 62 functions to control feed motor 63 and conveyance motor 64, based on an instruction from image formation controller 50.

Fixation controller 65 is configured to fix the transferred toner image to recording medium P. Specifically, fixation controller 65 functions to control application of voltage to an unillustrated heater provided in fixation unit 11, based on an instruction from image formation controller 50. Further, fixation controller 65 is configured to receive a temperature detected by thermistor 66 to measure the temperature of fixation unit 11 and to control to turn on and off the heater in fixation bat 11. Fixation controller 65 is configured to control fixation motor 67 to rotate fixation roller 11*a* with fixation backup roller 11*b*, when fixation unit 11 is heated to a predetermined temperature.

Figure 8:
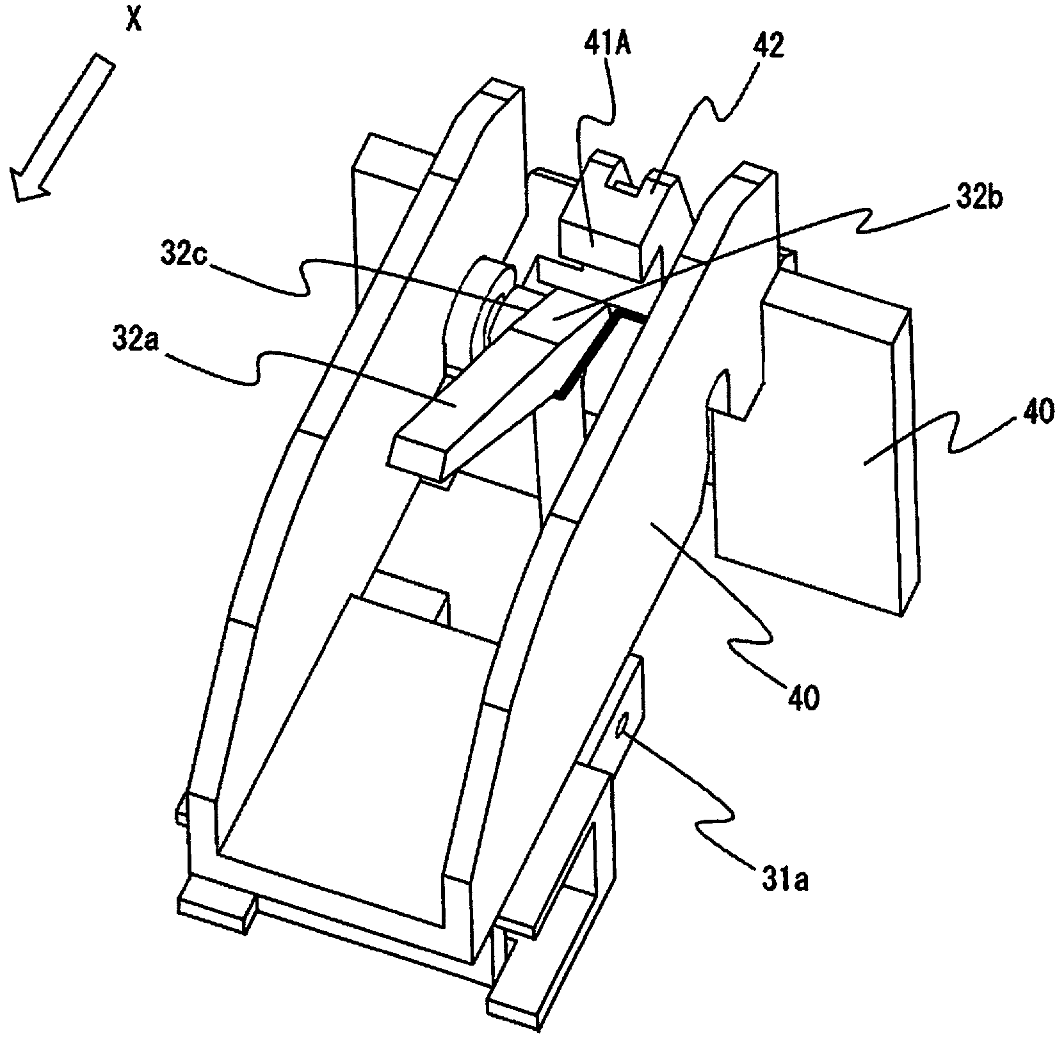
FIG. 8 is a perspective view illustrating a comparison example to be compared to the part of the medium detection device shown in FIG. 4.

FIG. 8 is a perspective view illustrating a comparison example to be compared to the part of the medium detection device shown in FIG. 4.

The configuration of medium detection device 30A shown in FIG. 8 is almost the same as that of medium detection device 30 shown in FIG. 4. But, guide surface 41A of the comparison example shown in FIG. 8 is formed extending in a direction orthogonal to travel direction X, whereas guide surface 41 of the embodiment shown in FIG. 4 is formed extending in a direction inclined with respect to travel direction X of recording medium P.

Figure 9:
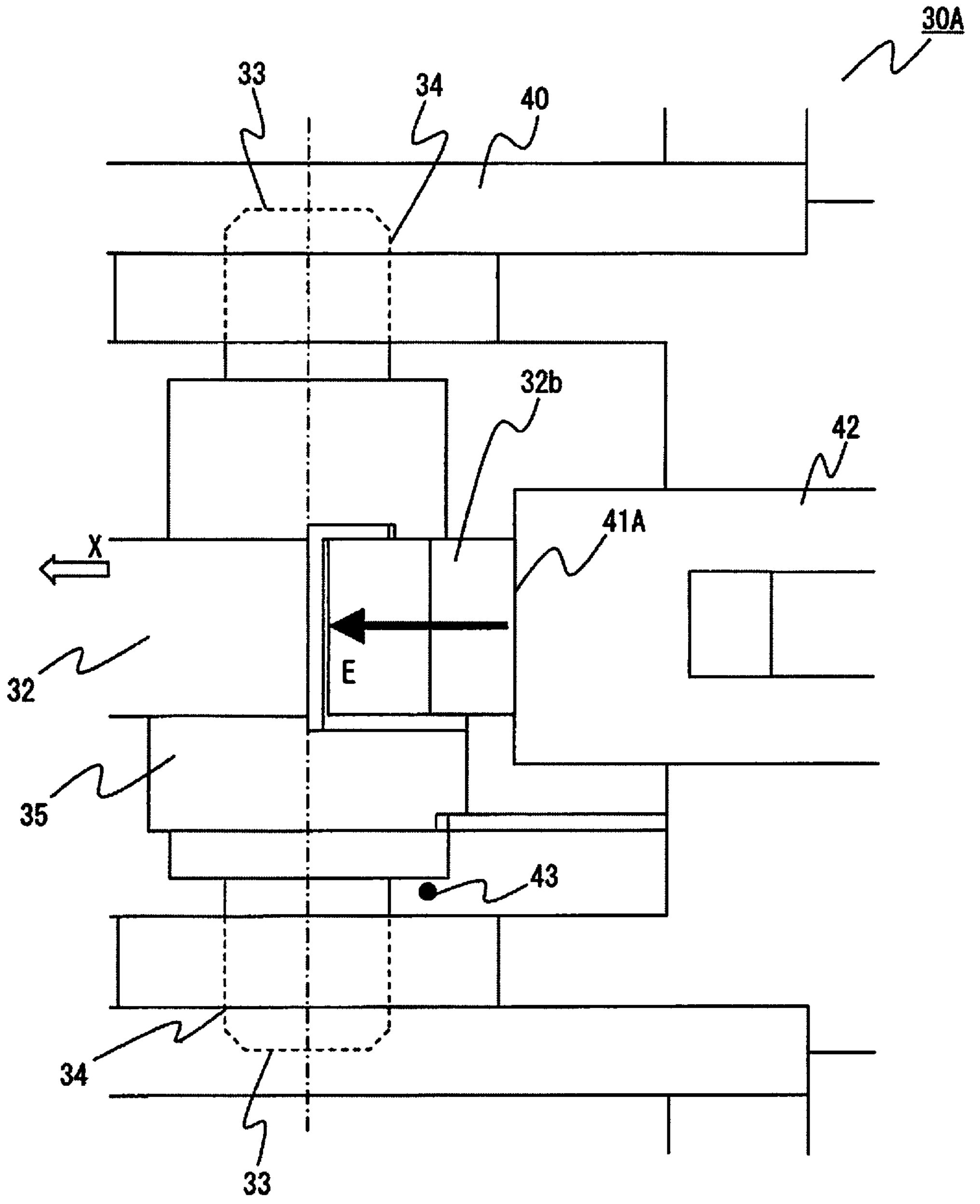
FIG. 9 is a plan view illustrating a comparison example to be compared to the medium detection device shown in FIG. 1.

FIG. 9 is a plan view illustrating the comparison example to be compared to the medium detection device shown in FIG. 1.

Medium detection device 30A of the comparison example shown in FIG. 9 has almost the same configuration as that of medium detection device 30 of the embodiment shown in FIG. 1. But, guide surface 41A of the comparison example shown in FIG. 9 is formed extending in the direction orthogonal to travel direction X, whereas guide surface 41 of the embodiment shown in FIG. 1 is formed extending in the direction inclined with respect to the travel direction of recording medium P.

Figure 10:
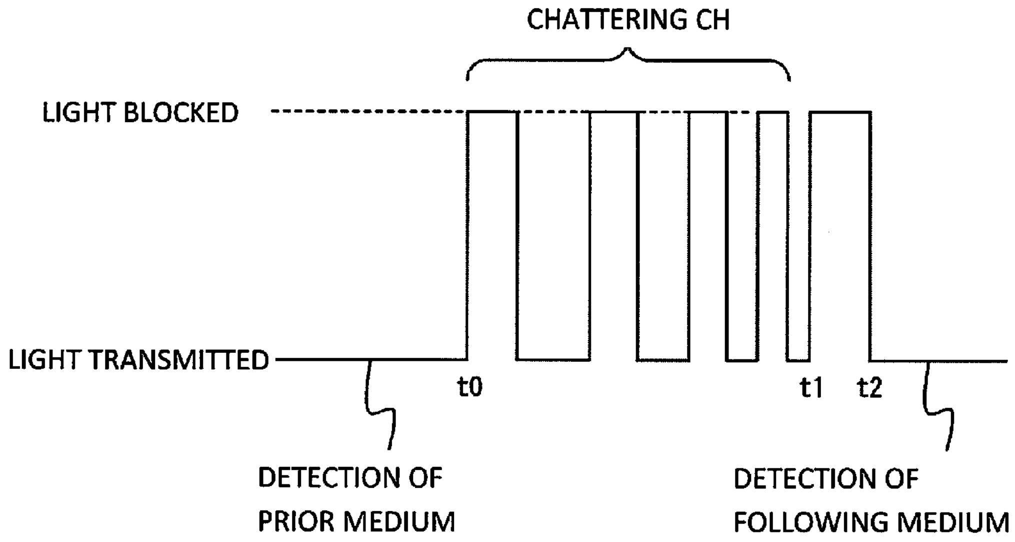
FIG. 10 is a schematic view illustrating a sensor waveform of a medium detection device shown in FIG. 8.

FIG. 10 is a schematic view illustrating a sensor waveform of medium detection device 30A shown in FIG. 8.

In the schematic view (FIG. 10) illustrating the sensor waveform, the horizontal axis indicates time while the vertical axis indicates a state of the light received signal. FIG. 10 shows chattering CH, which is a series of alternations of the light blocking state and the light transmitting state that occurs in sensor 31.

Figure 11:
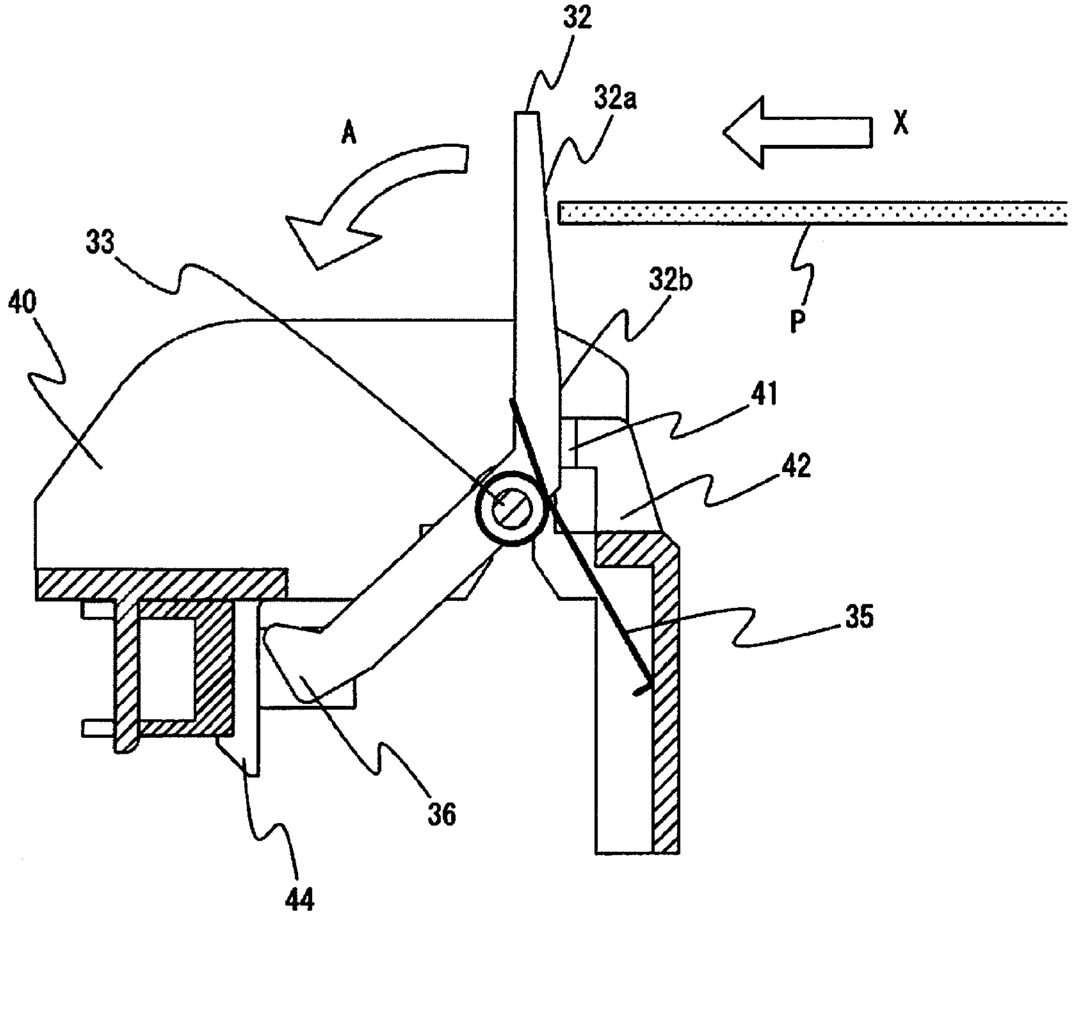
FIG. 11 is a sectional view illustrating an operational state of the medium detection device shown in FIG. 3 before the medium passes therethrough.

FIG. 11 is a sectional view illustrating an operational state of the medium detection device of FIG. 3 before the medium passes therethrough.

As shown in FIG. 11, rotational shaft 33 of sensor lever 32 is rotatably fit and supported in rotational shaft support 34 (not shown in FIG. 11) provided in support member 40. Sensor lever 32 includes the first portion extending from rotational shaft 33 in a substantially vertically upward direction in FIG. 11. The first portion includes, at the vicinity of rotational shaft 33, guide surface contact section 32*b* to come in contact with guide surface 41 of stopper 42. The first portion includes, at slightly higher than guide surface contact section 32*b*, medium contact section 32*a* to come in contact with the leading edge of recording medium P that travels (is conveyed).

Sensor lever 32 also includes the second portion extending from rotational shaft 33 in an obliquely downward direction in FIG. 11. The second portion includes, at the end portion thereof, light blocking part 36 to turn sensor 31 to the light blocking state. Sensor 31 is attached to and supported by sensor support 44. Rotational shaft 33 is equipped with torsion spring 35 to rotate sensor lever 32 in the opposite direction to rotation direction A thereby biasing sensor lever 32 toward stopper 42.

Figure 12:
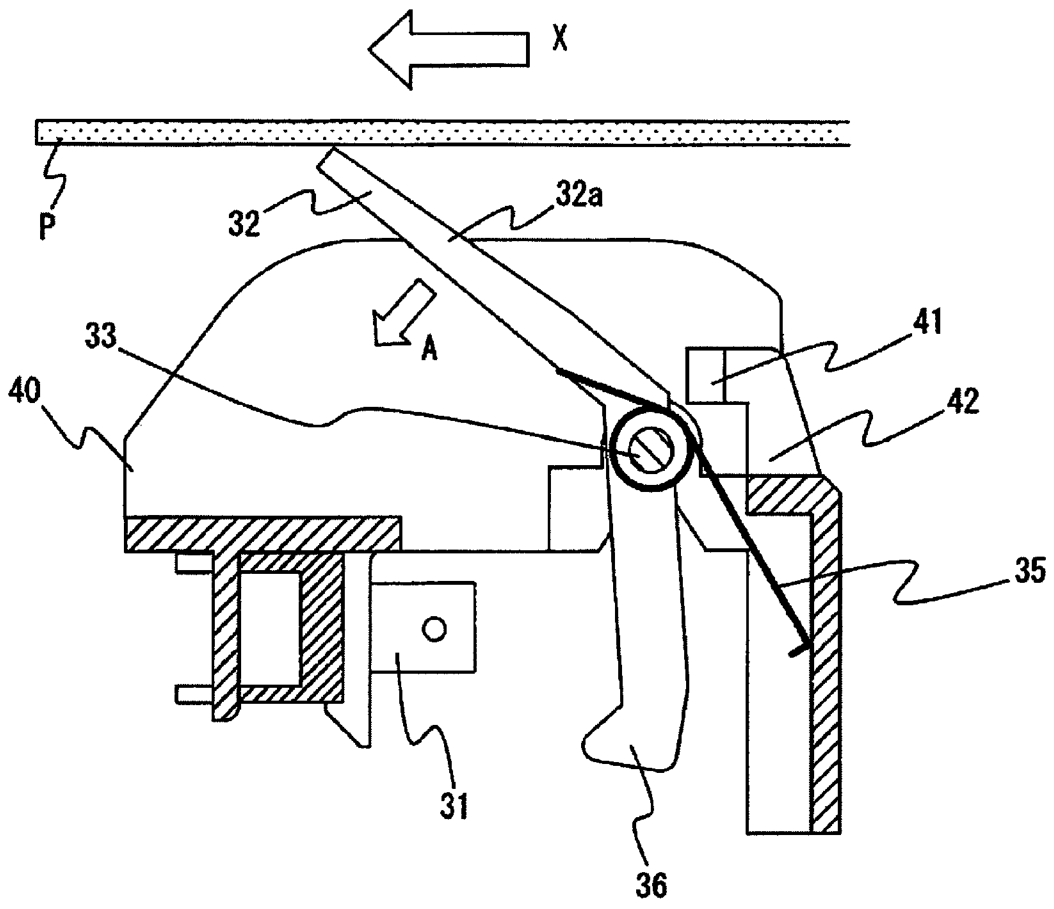
FIG. 12 is a sectional view illustrating an operational state of the medium detection device shown in FIG. 3 when the medium is passing therethrough.

FIG. 12 is a sectional view illustrating an operational state of medium detection device 30 shown in FIG. 3 when the medium is passing therethrough.

The configuration of the medium detection device shown in FIG. 12 is already described in the description regarding FIG. 11, but the rotational position of sensor lever 32 in FIG. 12 is different from that in FIG. 11. In FIG. 12, sensor lever 32 has been rotated in rotation direction A by means of the conveyance motion of recording medium P, so that light blocking part 36 has been rotated to allow the output light to pass, turning sensor 31 to the light transmitting state.

Figure 13:
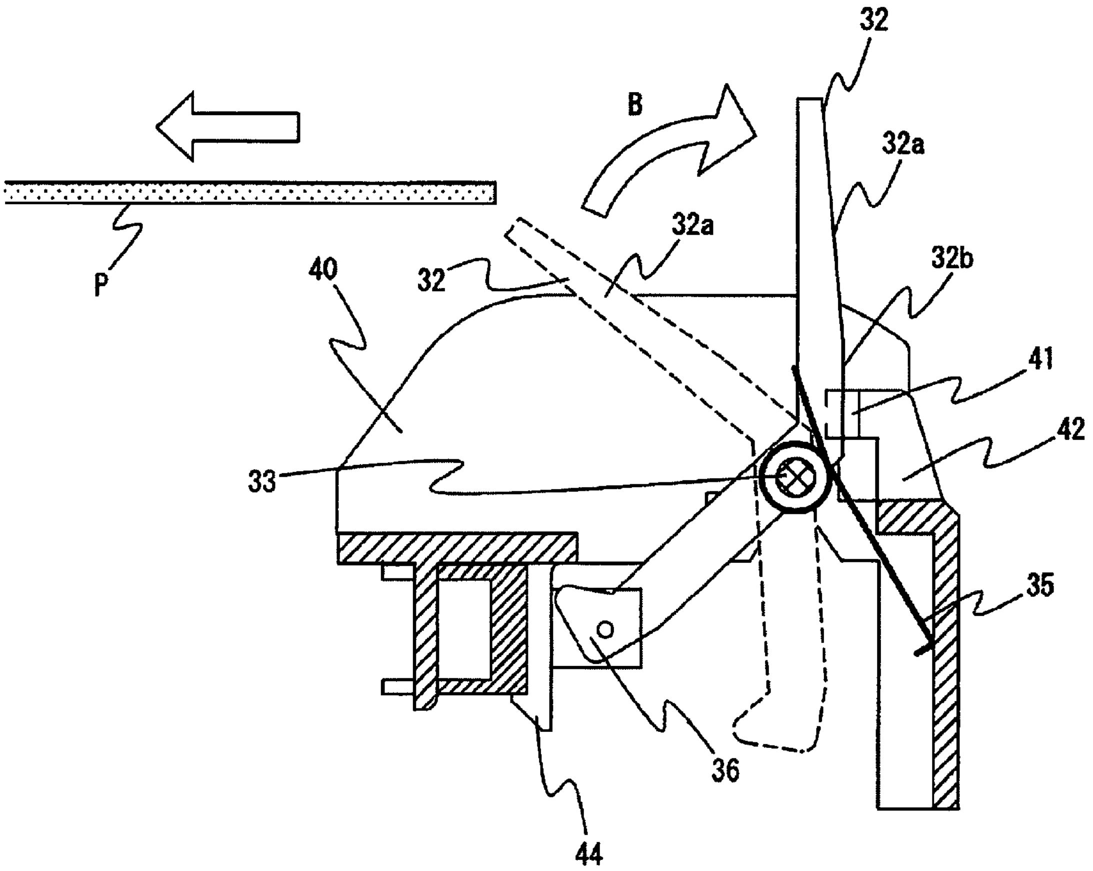
FIG. 13 is a sectional view illustrating an operational state of the medium detection device shown in FIG. 3 after the medium passed therethrough.

FIG. 13 is a sectional view illustrating an operational state of medium detection device 30 shown in FIG. 3 after the medium has passed therethrough.

The configuration of the medium detection device shown in FIG. 13 is already described in the description regarding FIGS. 11 and 12.

General Operation of the Image Formation Apparatus According to the First Embodiment General operation of the image formation apparatus will be described with reference to FIGS. 2 and 7.

Image formation controller 50 receives print data and a control command(s) transmitted from an unillustrated external apparatus via I/F controller 71. Upon receiving a print instruction from the external apparatus, image formation controller 50 gives medium feed/conveyance drive controller 62 an instruction including a predetermined conveyance speed to rotate feed roller 2, thereby conveying one sheet of recording medium P from sheet cassette 1 to conveyance rollers 4 and 5. Inlet sensor 3 is provided to detect whether feed roller 2 has fed normally or not and to prompt, if feed roller 2 has not fed normally, a feeding operation again.

Recording medium P that is fed and arrived at conveyance rollers 4 and 5 is conveyed by conveyance rollers 4 and 5 to image formation unit 20K. At almost the same time as the start of the feeding operation, image formation units 20K, 20Y, 20M, 20C start the rotations of rollers or the like in the image formation unit while negative voltage (approximately −1000 V) that is instructed from image formation controller 50 to charging voltage controller 51 is started to be applied to charging rollers 22K, 22Y, 22M, 22C, thereby the surfaces of photosensitive drums 21K, 21Y, 21M, 21C are charged.

Toners for printing are supplied from toner tanks 26K, 26Y, 26M, 26C via toner-supplying sponge rollers 24K, 24Y, 24M, 24 to development rollers 23K, 23Y, 23M, 23C. Toners on development rollers 23K, 23Y, 23M, 23C are triboelectrically-charged by development blades 25K, 25Y, 25M, 25C. When the rotations of photosensitive drums 21K, 21Y, 21M, 21C are started, the rotation of belt driving roller 7 is started to run conveyance belt 9.

Recording medium P is further conveyed by conveyance rollers 4 and 5. At a predetermined time after write sensor 6 detects the leading edge of recording medium P, LED head 15K starts the exposure to form an electrostatic latent image on photosensitive drum 21K.

The electrostatic latent image formed on photosensitive drum 21K is developed to be a toner image by development roller 23K rotating in contact with photosensitive drum 21K. At a time when recording medium P reaches a position between photosensitive drum 21K and image transfer rollers 10K, a positive voltage (about +3000 V) is applied to image transfer rollers 10K, thereby the toner image is attracted toward and transferred onto recording medium P.

Likewise, operations of exposing and transferring the other colors (yellow, magenta, and cyan) are sequentially executed. After all the color images are transferred onto recording medium P, recording medium P is heated and pressed between fixation roller 11*a* and fixation backup roller 11*b*, thereby the toner is fixed to recording medium P. After the fixation, the leading edge of recording medium P turns on medium detection device 30 (discharge sensor) which may function to monitor for paper jams in fixation unit 11 and for detecting the length of the medium. After the tailing edge of recording medium P turns off medium detection device 30, recording medium P is discharged by discharge rollers 12 and 13 to a discharge tray in the upper portion of the image formation apparatus.

Operation of the Medium Detection Device of the First Embodiment

The operation of medium detection device 30 according to the first embodiment will be described with reference to FIGS. 11, 12, and 13.

When recording medium P that is heated and pressed between fixation roller 11*a* and fixation backup roller 11*b* reaches medium detection device 30 as shown in FIG. 11, the leading edge of recording medium P collides with medium contact section 32*a* of medium detection device 30 and rotates sensor lever 32 in a direction of arrow A against the biasing force of torsion spring 35 as shown in FIG. 12. With this rotation of sensor lever 32, light blocking part 36 rotates out of the detection area. This turns sensor 31 to the light transmitting state from the light blocking state. That is, light receiving section 31*a* of sensor 31 receives the output light, detecting recording medium P running therethrough.

As shown in FIG. 13, when the tailing edge of recording medium P passes through medium contact section 32*a*, sensor lever 32 rotates in the direction of arrow B from the biasing force of torsion spring 35, and guide surface contact section 32*b* of sensor lever 32 collides with guide surface 41 formed at stopper 42.

The operation of medium detection device 30 after the collision of guide surface contact section 32*b* with guide surface 41 will be described, as comparing medium detection device 30 according to the first embodiment of the invention with medium detection device 30A shown in FIGS. 8 and 9 according to the comparison example.

Operation of Medium Detection Device 30A According to the Comparison Example Guide surface contact section 32*b* shown in FIG. 8 collides with guide surface 41A. As shown in FIG. 9, guide surface contact section 32*b* receives repulsive force E from guide surface 41A as the reaction of the collision. Repulsive force E acts along travel direction X of recording medium P, that is, the rotation direction of sensor lever 32. With this repulsive force E, sensor lever 32 is bounced about rotational shaft 33 in travel direction X of recording medium P.

As a result, since light blocking part 36 rotates out of the detection area between light receiving section 31*a* and light emitting section 31*b*, sensor 31 is turned to the light transmitting state. Then, with the biasing force of torsion spring 35, sensor lever 32 rotates again in the direction opposite to travel direction X of recording medium P and collides with guide surface 41.

Likewise, sensor lever 32 oscillates multiple times with the biasing force of torsion spring 35 and repulsion force E as the reaction of the collision. As a result, as shown in FIG. 10, chattering occurs.

In FIG. 10, before time t0 (in the left side of time t0 in the figure), prior recording medium P is passing through medium detection device 30, and thus sensor 31 is in the light transmitting state. At time t0, after the tailing edge of recording medium P passes medium detection device 30, sensor lever 32 collides with guide surface 41 by means of the biasing force of torsion spring 35, thereby chattering CH occurs. Every time sensor lever 32 collides, repulsion force E gradually becomes smaller. Thus, after a certain times of the collisions, that is, at time t1, sensor 31 is turned to the light blocking state.

After a certain time elapses, that is, at time t2, the following recording medium P reaches medium detection device 30. When the following recording medium P reaches the medium detection device 30, sensor 31 is turned to the light transmitting state, as detecting the following recording medium P passing therethrough. However, for example, if the conveyance speed of recording medium P is fast, the following recording medium P reaches medium detection device 30 in the middle of chattering CH, the tailing edge of the prior recording medium P and the leading edge of the following recording medium P cannot be properly detected, thereby a false detection occurs.

Operation of Medium Detection Device 30 According to the First Embodiment

As shown in FIG. 1, guide surface 41 formed at stopper 42 is formed inclined with respect to travel direction X of recording medium P at angle θ. That is, guide surface 41 is inclined to guide, when guide surface contact section 32*b* collides with guide surface 41, sensor lever 32 in a direction different from the rotation direction of sensor lever 32 (travel direction X of recording medium P). Therefore, repulsive force F from guide surface 41, which is applied to guide surface contact section 32*b*, acts in the direction different from travel direction X.

In other words, repulsive force F applied to sensor lever 32 is resolved into component force F1 in travel direction X of recording medium P and component force F2 in the direction along rotational shaft 33 of sensor lever 32. Therefore, a repulsive force in travel direction X, which is component force F1, in this embodiment is smaller than that (repulsion force E) in the comparison example.

Gap 43 is provided between sensor lever 32 and support member 40, having a predetermined width along rotational shaft 33. Thus, after sensor lever 32 collides with stopper 42, by means of component force F2 of repulsion force F, sensor lever 32 moves in the direction along rotational shaft 33 by the width of gap 43 while colliding with support member 40, or by less than the width of gap 43 without colliding with support member 40. Then, by means of the restorative force of sensor lever 32, sensor lever 32 is restored to the initial position, parallel to travel direction X. If sensor lever 32 collides with support member 40, guide surface contact section 32*b* moves in the direction opposite to component force F2 and sensor lever 32 moves, by the restorative force of sensor lever 32, to the initial position, parallel to travel direction X.

Here, in the case where angle θ between guide surface 41 and travel direction X of recording medium P is excessively small, sensor lever 32 may easily get stuck between guide surface 41 and support member 40 opposed to guide surface. This may cause an operation failure upon a collision of the leading edge of recording medium P against sensor lever 32.

In the case where angle θ is excessively large, component force F1 becomes relatively large as compared to component force F2, that is, component force F2 which guides sensor lever 32 toward the direction different from travel direction X of recording medium P becomes small, thereby chattering CH is likely to occur. Therefore, angle θ between travel direction X and guide surface 41 is preferably equal or less than 45 degree. For example, angle θ is more preferably from 20 to 45 degree. If angle θ is less than 20 degree, sensor lever 32 may be likely to get stack between guide surface 41 and a part opposite to guide surface 41. On the other hand, if angel θ is more than 45 degree, component force F2 becomes small, that is, the direction of repulsive force F has a little difference from the rotation direction (travel direction X), thereby chattering CH cannot be sufficiently suppressed.

Medium detection device 30 according to the first embodiment operates as described above. That is, repulsive force F from guide surface 41 against sensor lever 32 acts in the direction different from travel direction X, thereby having the sensor wave shown in FIG. 6. As shown in FIG. 6 showing the sensor wave, when the tailing edge of recording medium P passes over the medium detection device P at time t0, sensor lever 32 collides with guide surface 41 with the biasing force of torsion spring 35. With this, sensor 31 is once turned to the light blocking state when sensor lever 32 is in contact with stopper 42, and then sensor 31 is turned to the light transmitting state again when sensor lever 32 is bounced away from stopper 42 with repulsive force F.

However, since component force F1, which is smaller than repulsive force F, is applied to sensor lever 32 in travel direction X, chattering CH hardly occurs. At time t1, sensor 31 is turned to the light blocking state and becomes stabilized. Therefore, this embodiment prevents chattering CH caused by rebounds of sensor lever 32, so that after detection of the tailing edge of the prior recording medium P, the leading edge of the following recording medium P is properly detected, that is, a false detection is prevented.

Modifications of the First Embodiment

Figure 14:
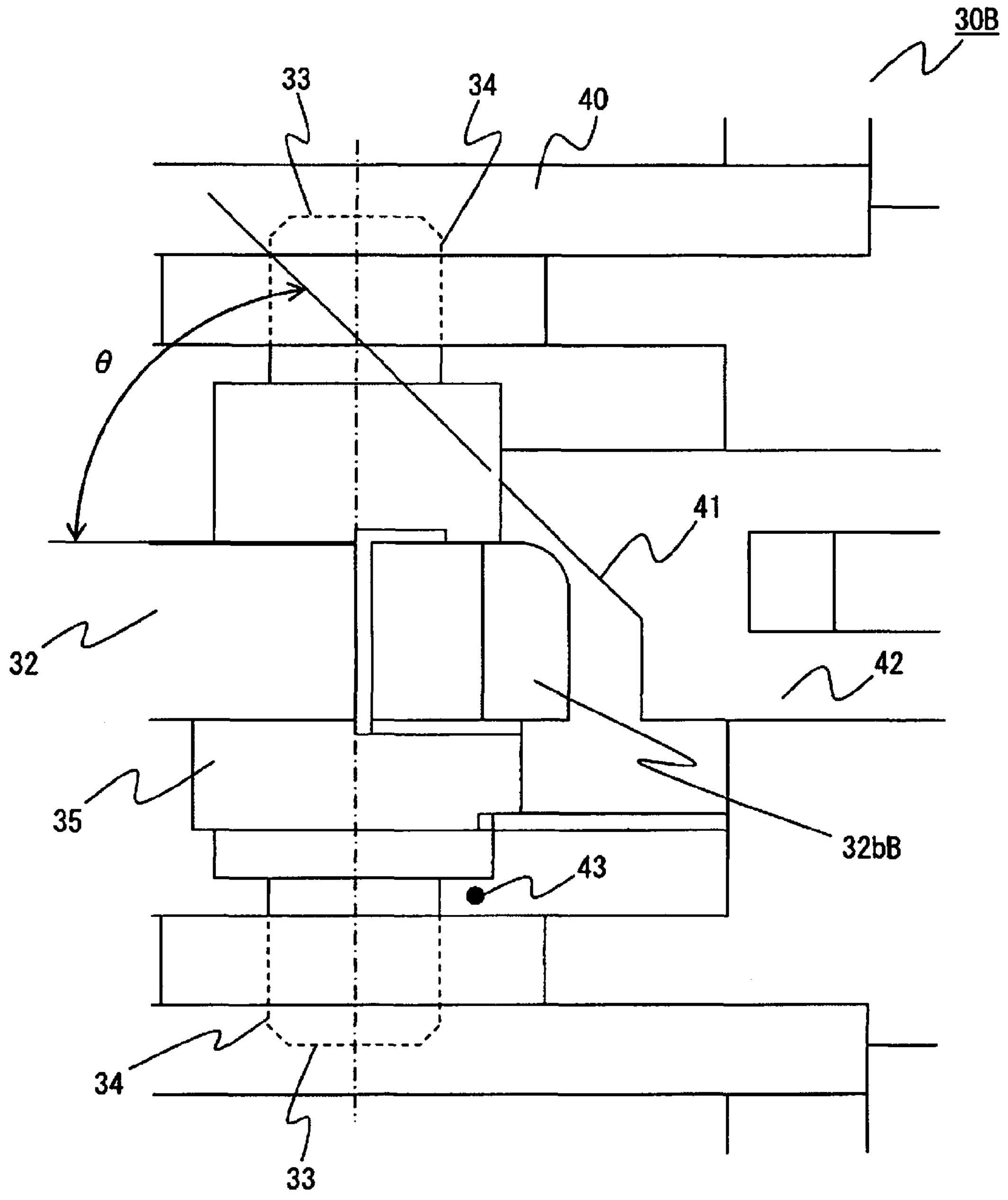
FIG. 14 is a plan view illustrating a first modification of the medium detection device of FIG. 1.
Figure 15:
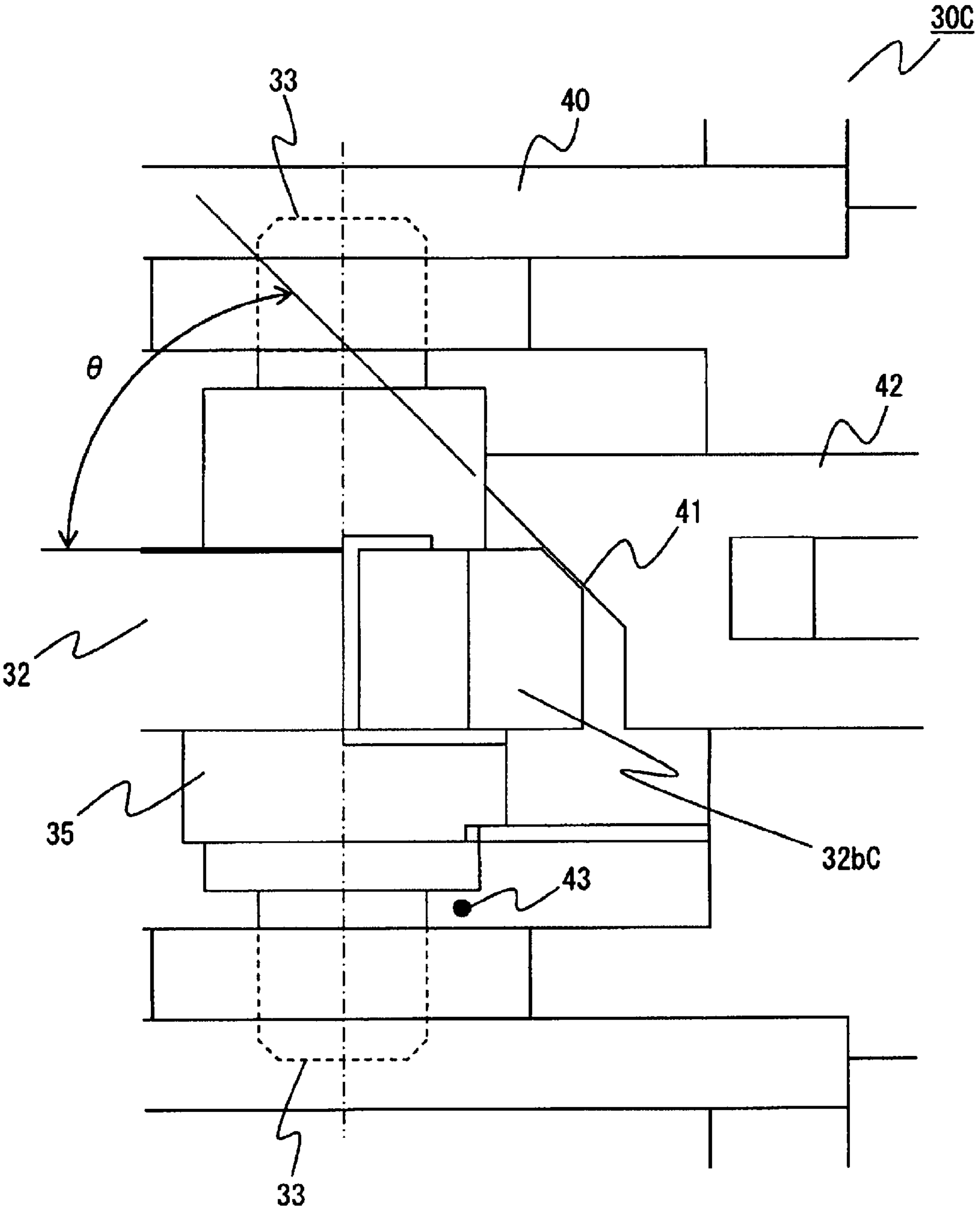
FIG. 15 is a plan view illustrating a second modification of the medium detection device of FIG. 1.

FIG. 14 is a plan view illustrating a first modification of medium detection device 30 of FIG. 1. FIG. 15 is a plan view illustrating a second modification of medium detection device 30 of FIG. 1.

Medium detection device 30B shown in FIG. 14 according to the first modification has almost the same configuration as medium detection device 30 shown in FIG. 1. Medium detection device 30 shown in FIG. 1 has guide surface contact section 32*b* whose ridge line 32*c* comes in contact with guide surface 41. On the other hand, medium detection device 30B shown in FIG. 14 according to the first modification has guide surface contact section 32*b*B whose ridge line 32*c* is chamfered having a curved chamfer face.

Likewise, medium detection device 30C shown in FIG. 15 according to the second modification has the same configuration as medium detection device 30 except for the configuration of ridge line 32*c*. Medium detection device 30C has guide surface contact section 32*b*C whose ridge line 32*c* is chamfered having a flat face at an angle of 45 degree.

Those chamfered faces according to the first and second modifications suppress abrasion or breakage of a collision area upon the collision of guide surface contact section 32*b*B, 32*b*C against guide surface 41.

Effects of the First Embodiment

According to the first embodiment, the following effects (1) to (4) are achieved.

(1) Guide surface 41 formed at stopper 42 of support member 40 is inclined with respect to travel direction X of recording medium P. With this configuration, when sensor lever 32 rotates in the direction opposite to travel direction X after detecting the tailing edge of recording medium P, a part of repulsive force F occurring upon the collision of sensor lever 32 against stopper 42 is turned to the direction along rotational shaft 33. Therefore, upon the collision of sensor lever 32 against stopper 42, chattering CH is prevented.

(2) Since chattering CH is prevented, the leading edge of the following recording medium P is reliably detected even through the traveling speed of recording media P is fast.

(3) In the first modification of the first embodiment, ridge line 32*c* of guide surface contact section 32*b* is chamfered. Therefore, a collision area upon the collision of guide surface contact section 32*b* against guide surface 41 is prevented from being worn or broken.

(4) The image formation apparatus of the first embodiment is configured having medium detection device 30, 30B, or 30C. This prevents chattering CH of sensor 31. Therefore, the distance between two traveling recording media P can be shortened, that is, the printing speed of the image formation apparatus can be improved.

Second Embodiment

Configuration of the Second Embodiment

Figure 16:
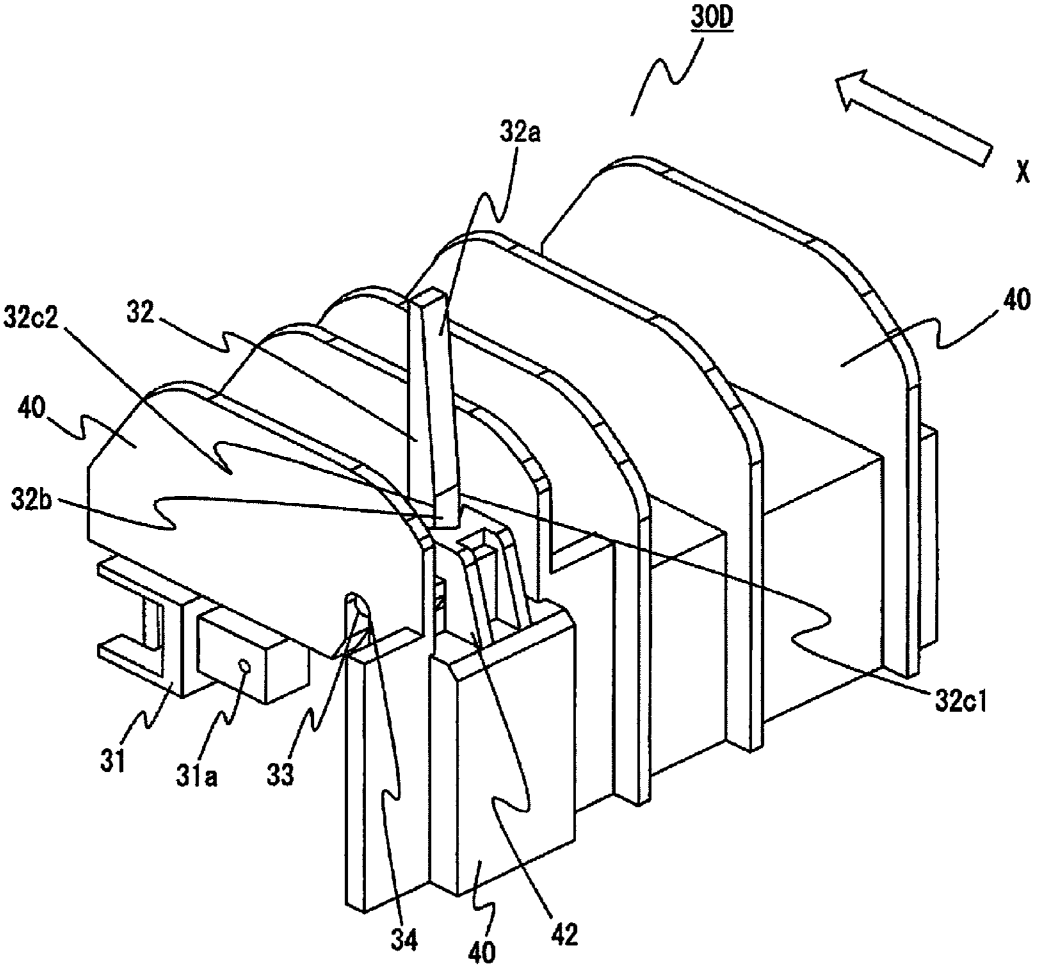
FIG. 16 is a perspective view illustrating the entire medium detection device according to a second embodiment of the invention.

FIG. 16 is a perspective view illustrating the entire part of medium detection device 30D according to a second embodiment of the invention. In FIG. 16, the same constituents as in FIG. 1 according to the first embodiment are designated by the same reference numerals.

The configuration of medium detection device 30D according to the second embodiment is almost the same as that of the first embodiment shown in FIG. 1. Medium detection device 30D according to the second embodiment has guide surfaces 41D1 and 41D2 (not shown in FIG. 16) and ridge lines 32*c*1 and 32*c*2 to come in contact with guide surfaces 41D1 and 41D2, which are different from the corresponding parts in the first embodiment.

Figure 17:
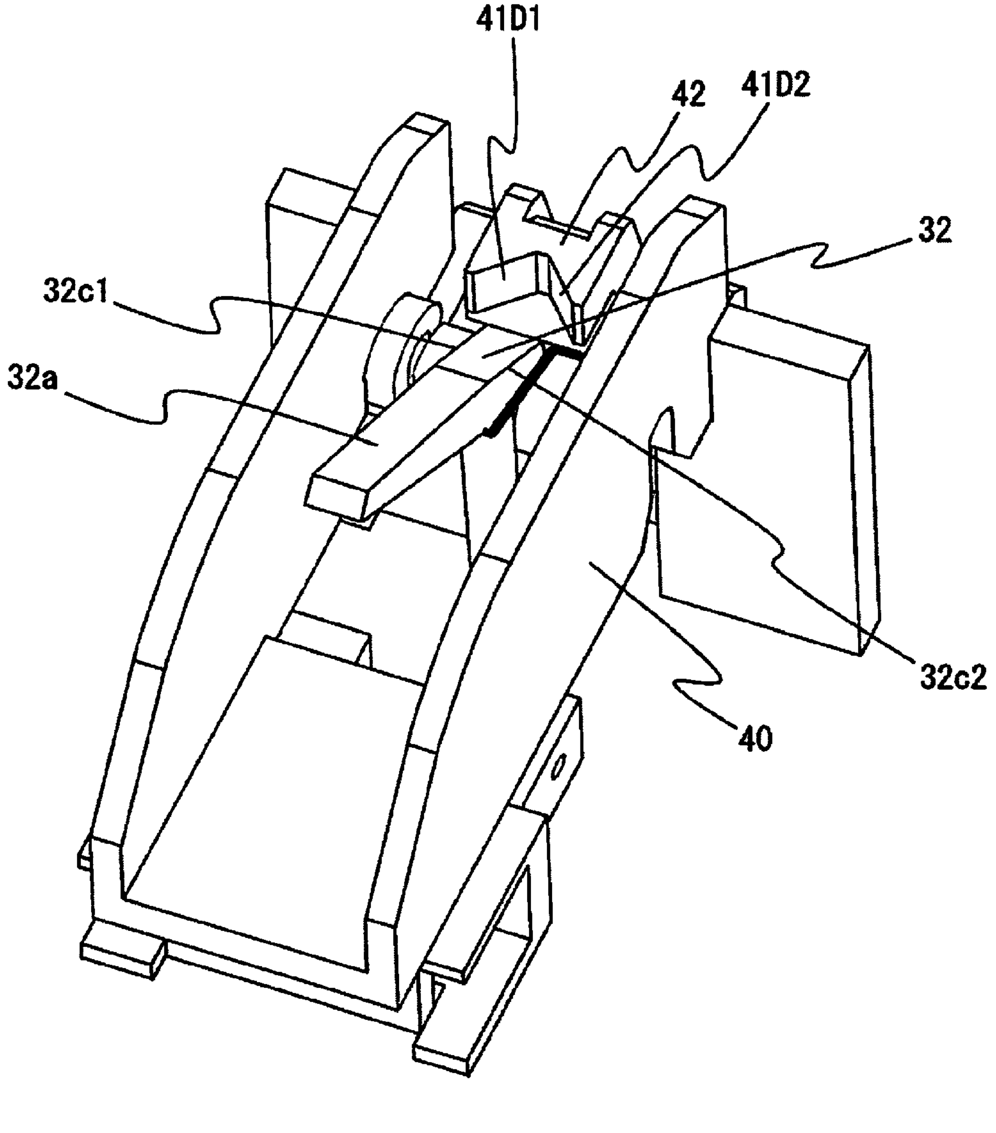
FIG. 17 is a perspective view illustrating a part of the medium detection device of FIG. 16.

FIG. 17 is a perspective view illustrating a part of medium detection device 30D shown in FIG. 16. In FIG. 17, the same constituents as in FIG. 4 according to the first embodiment are designated by the same reference numerals.

Medium detection device 30 according to the first embodiment has guide surface 41 or an inclined face inclined with respect to travel direction X of recording medium P. On the other hand, as shown in FIG. 17, medium detection device 30D according to the second embodiment has guide surface 41D1, serving as a first inclined surface, inclined with respect to travel direction X of recording medium P and guide surface 41D2, serving as a second inclined surface, facing guide surface 41D1 and inclining toward the side opposite to guide surface 41D1 with respect to travel direction X.

Figure 18:
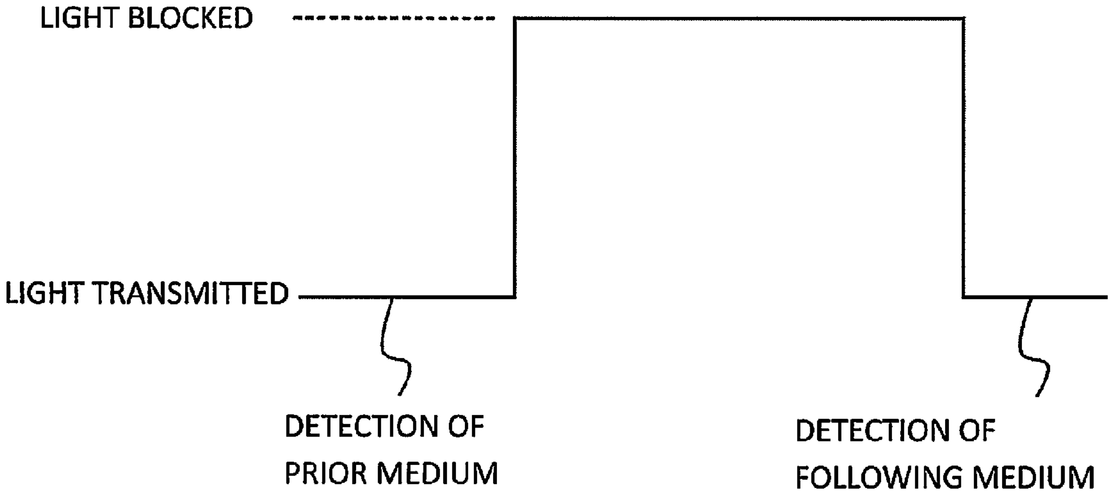
FIG. 18 is a schematic view illustrating a sensor waveform of the medium detection device of FIG. 16.

FIG. 18 is a schematic view illustrating a sensor waveform of medium detection device 30D shown in FIG. 16. In FIG. 18 illustrating the sensor waveform, the horizontal axis indicates time and the vertical axis indicates the state of light received signal, in the same way as in FIG. 6 according to the first embodiment.

Figure 19:
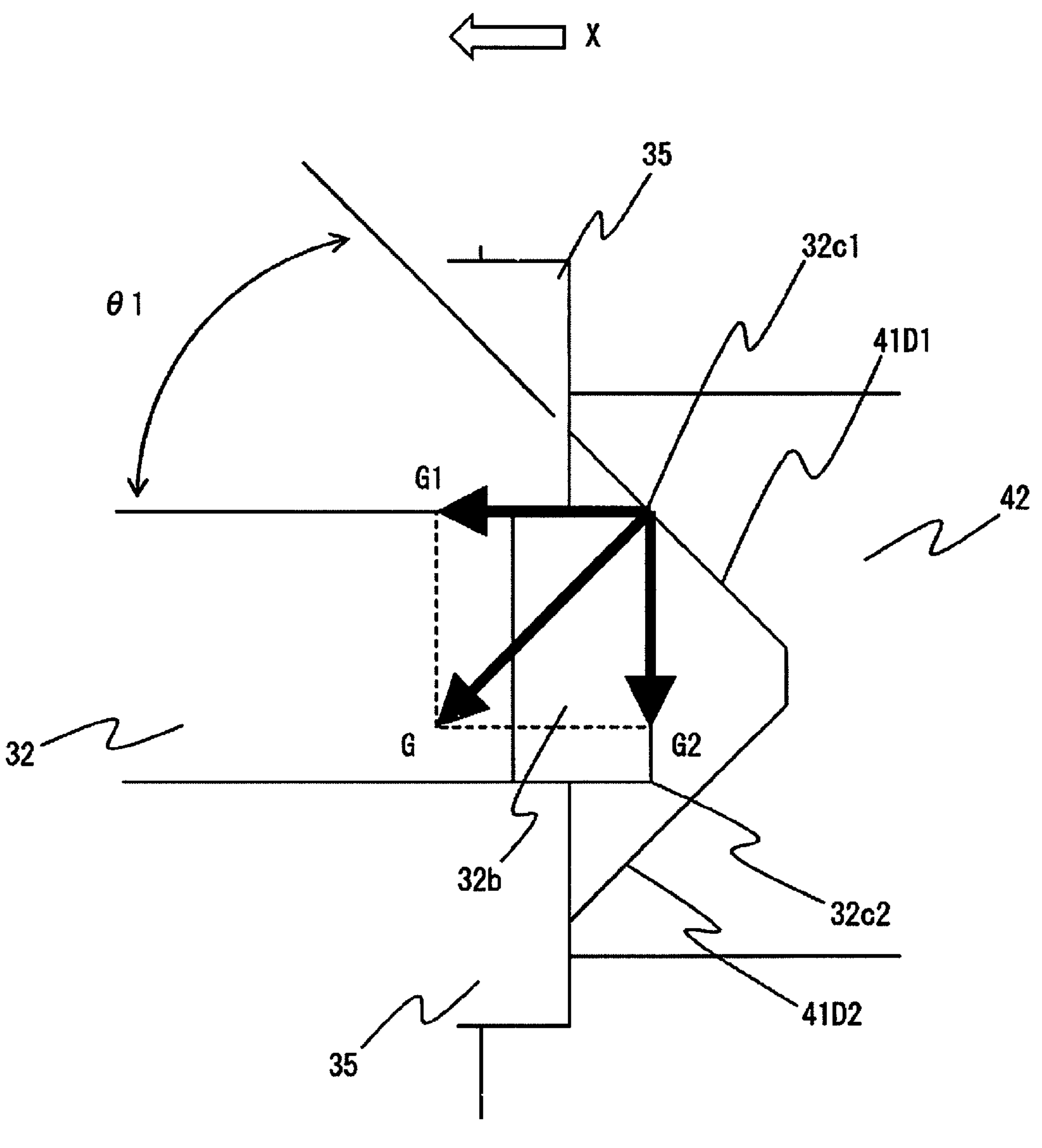
FIG. 19 is a plan view illustrating operation 1 of the medium detection device of FIG. 16.

FIG. 19 is a plan view illustrating operation 1 of medium detection device 30D shown in FIG. 16. FIG. 19 illustrates the state where sensor lever 32 collides with guide surface 41D1 at ridge line 32*c*1. In the second embodiment, guide surface 41D1 and guide surface 41D2, which are provided at stopper 42 of support member 40, function to come in contact with guide surface contact section 32*b* of sensor lever 32 thereby regulating (stopping) the rotation of sensor lever 32 in the biasing direction.

Guide surfaces 41D1 and 41D2 are inclined with respect to guide surface contact section 32*b*, so that guide surfaces 41D1 and 41D2 guide sensor lever 32 in directions different from travel direction X of recording medium P upon the collision of sensor lever 32 against guide surfaces 41D1 and 41D2. The angle defined between travel direction X and guide surface 41D1 is designated by θ1.

When sensor lever 32 collides with guide surface 41D1, repulsive force G upon the collision acts along a direction orthogonal to guide surface 41D1 (that is, the normal direction of guide surface 41D1). Repulsive force G is resolved into component force G1 in travel direction X and component force G2 in a direction orthogonal to travel direction X.

Figure 20:
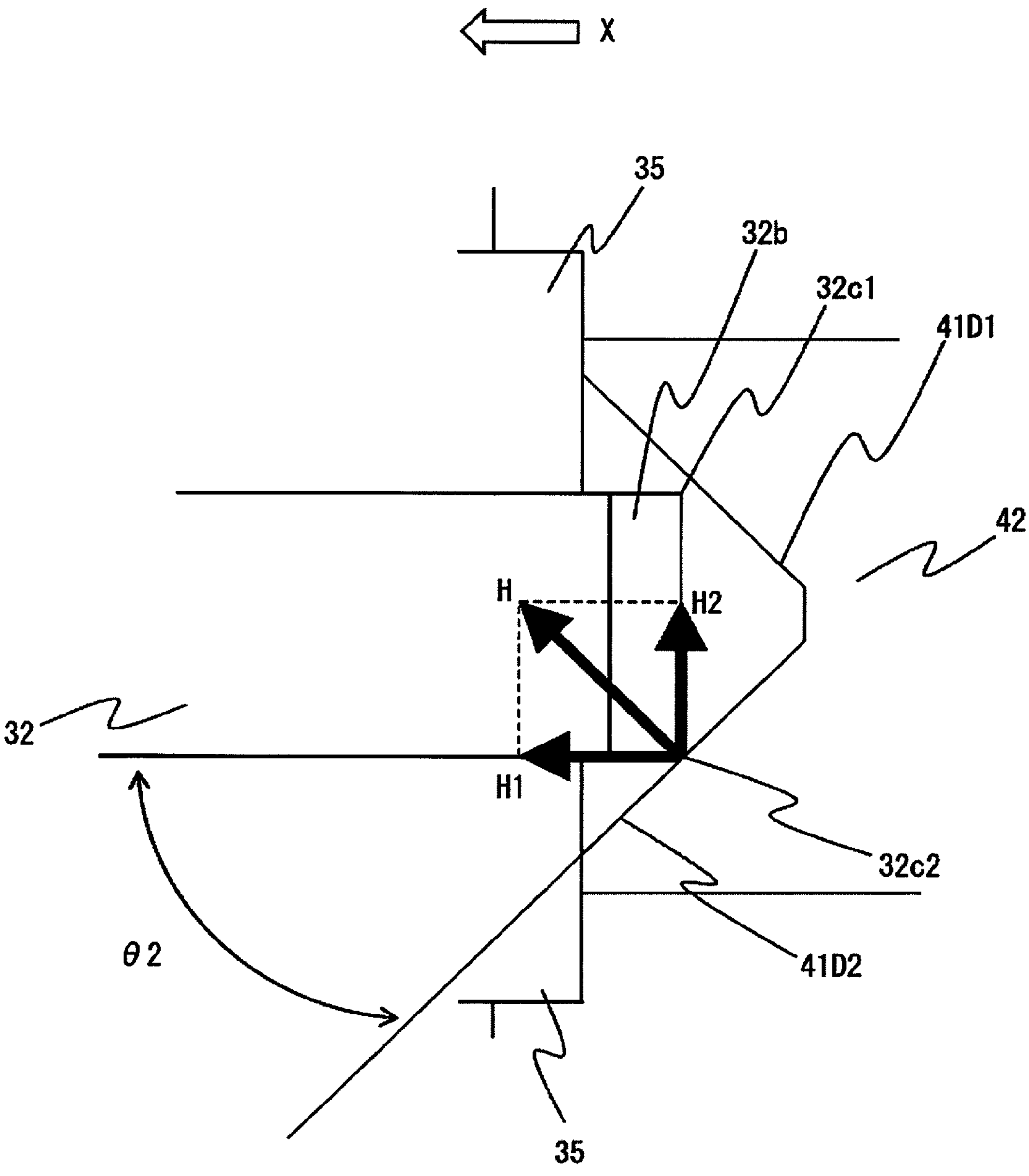
FIG. 20 is a plan view illustrating operation 2 of the medium detection device of FIG. 16.

FIG. 20 is a plan view illustrating operation 2 of medium detection device 30D shown in FIG. 16. FIG. 20 illustrates the state where sensor lever 32 collides with guide surface 41A2 at ridge line 32c2.

The angle defined between travel direction X and guide surface 41A2 is designated by $\theta 2$. When sensor lever 32 collides with guide surface 41A2, repulsive force H upon the collision acts along a direction orthogonal to guide surface 41A2 (that is, the normal direction of guide surface 41D2). Repulsive force H is resolved into component force H1 in travel direction X and component force H2 in a direction orthogonal to travel direction X.

Figure 21:
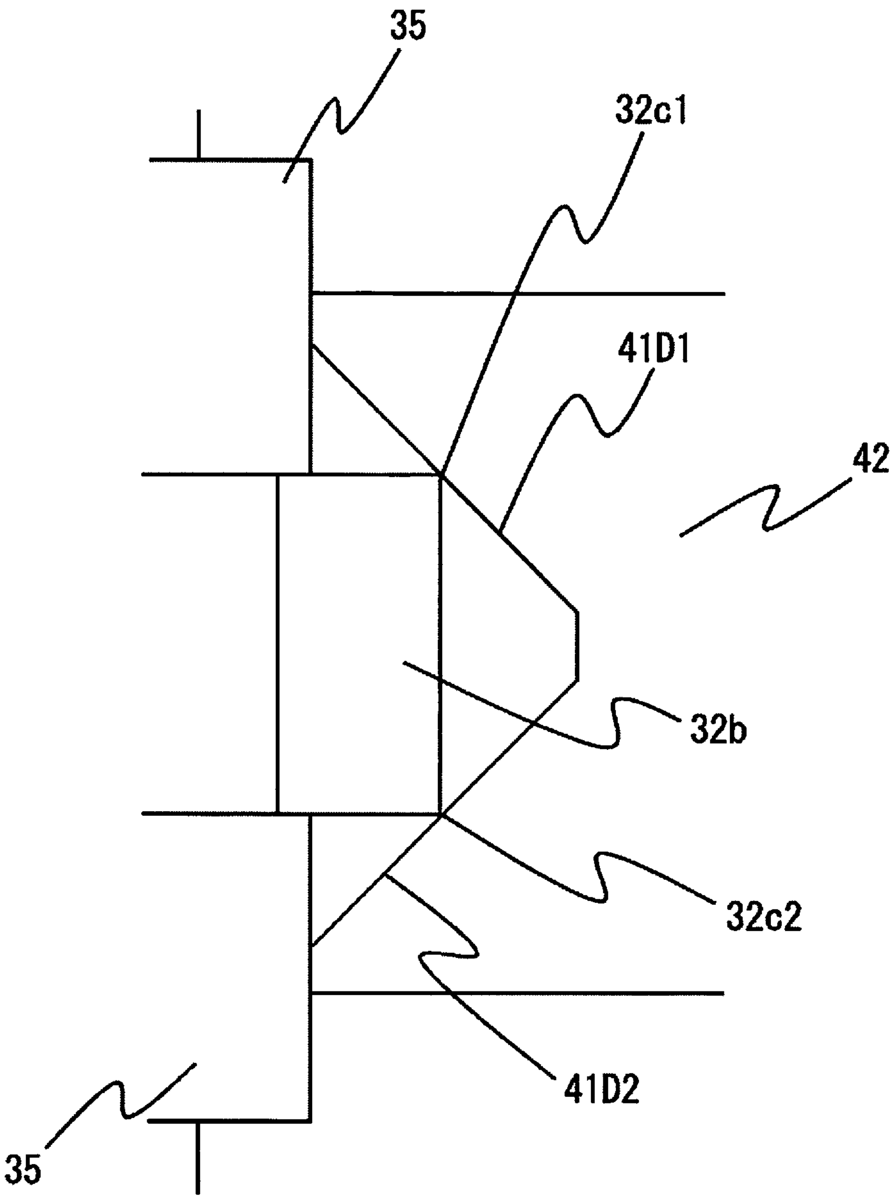
FIG. 21 is a plan view illustrating operation 3 of the medium detection device of FIG. 16.

FIG. 21 is a plan view illustrating operation 3 of medium detection device 30D shown in FIG. 16. FIG. 21 illustrates the state where guide surface contact section 32b is stopped as being in contact with guide surface 41D1 and guide surface 41D2.

Operation of the Second Embodiment

The operation of the image formation apparatus according to the second embodiment is the same as that of the first embodiment.

The operation of medium detection device 30D according to the second embodiment will be described. As shown in FIG. 19, when guide surface contact section 32b collides with guide surface 41A1 at ridge line 32c1, repulsive force G from guide surface 41A1 against guide surface contact section 32b acts in a direction different from travel direction X, since guide surface 41A1 is formed to be inclined with travel direction X of recording medium P, That is, repulsive force G against sensor lever 32 is resolved into component force G1 in the rotation direction of senior lever 32 (that is, travel direction X of recording medium P) and component force G2 in a direction of rotational shaft 33 of sensor lever 32. Thus, component force G2 moves sensor lever 32 along rotational shaft 33.

When sensor lever 32 moves along rotational shaft 33, as shown in FIG. 20, guide surface contact section 32b collides with guide surface 41D2. Repulsive force H against guide surface contact section 32b upon the collision is resolved into component force H1 along the rotation direction of sensor lever 32 and component force H2 along rotational shaft 33 of sensor lever 32. Thus, component force H2, which directs in the opposite direction to component force G2, moves sensor lever 32 along rotational shaft 33.

After these minute movements along rotational shaft 33 are repeated, sensor lever 32 stops in such a manner that ridge line 32c1 of guide surface contact section 32b is in contact with が guide surface 41D1 and ridge line 32c2 of guide surface contact section 32b is in contact with guide surface 41D2, as shown in FIG. 21.

Here, angle $\theta 1$ between the rotation direction of sensor lever 32 (that is, travel direction X of recording medium P) and guide surface 41D1 and angle $\theta 2$ between the rotation direction of sensor lever 32 and guide surface 41D2 are equal or less than 45 degree, and are preferably from 20 to 45 degree.

With the above described operation, the direction of repulsion force G against sensor lever 32 is resolved into the travel direction of recording medium P and the direction of rotational shaft 33. Further, guide surface contact section 32b is stopped as the minute movements along the rotational shaft 33 are repeated, thereby the sensor waveform shown in FIG. 18 is obtained. Therefore, chattering CH caused by rebounding of sensor lever 32 can be more efficiently suppressed.

Note that even through guide surface contact section 32b collides with guide surface 41D1 first in the above description regarding the second embodiment, the same effects are achieved in the case where guide surface contact section 32b collides with guide surface 41D2 first.

Note that, in the case where guide surface contact section 32b collides with guide surfaces 41D1 and 41D2 at the same time, sensor lever 32 is hardly guided in a direction different from travel direction X of recording medium P. Thus, for example, it is preferable that the point of intersection between guide surface 41D1 and guide surface 41D2 is provided slightly out of the center line of sensor lever 32 along the longitudinal direction of sensor lever 32, or angle $\theta 1$ and angle $\theta 2$ are set satisfying $\theta 1>\theta 2$ or $\theta 1<\theta 2$.

Effects of the Second Embodiment

The second embodiment achieves the following effects in addition to the effects of the first embodiment.

Stopper 42 of support member 40 is formed with guide surface 41A1 and guide surface 41A2 inclined with respect to travel direction X of recording medium P. With this configuration, the direction of repulsive force G against sensor lever 32 is directed to not only travel direction X of recording medium P but also the direction of rotational shaft 33. Further, since guide surface contact section 32b is stopped as the minute movements along the direction of rotational shaft 33 are repeated, the second embodiment obtains the sensor waveform shown in FIG. 18 and prevents chattering CH caused by rebounding of sensor lever 32 more effectively than the first embodiment.

Modifications of the First and Second Embodiments

The invention is not limited to the first and second embodiments and the modification thereof and may include other modifications, for example, the following modifications (a) to (e).

(a) Medium detection devices 30, 30A to 30D are applied to the discharge sensor in the first and second embodiments, but may be applied to various sensors used in the image formation apparatus, such as inlet sensor 3 and write sensor 6.

(b) Although guide surface 41 is inclined with respect to ravel direction X of recording medium P in the first embodiment, guide surface 41 may be a concave surface face with respect to travel direction X.

(c) Although the restoring movement of sensor lever 32 after recording medium P passes is caused by the biasing force of torsion spring 35 in the first and second embodiments, the restoring movement of sensor lever 32 may be caused by the weight of sensor lever 32, for example, in such a manner that the center of gravity of sensor lever 32 is set lower than rotational shaft 33.

(d) Although the image formation apparatus in the first and second embodiments is a page printer, the invention is not limited to this and may be applied to a facsimile machine, copy machine, a MFP (Multifunction Printer/Product/Peripheral), or the like.

(e) Although image formation units 20K, 20Y, 20M, and 20C are driven respectively by K-motor 55K, Y-motor 55Y, M-motor 55M, and C-motor 55C which are separated from each other in the first and second embodiments, image formation units 20K, 20Y, 20M, and 20C may be driven by a single motor.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A medium detection device provided on a medium transport structure, the medium detection device comprising:

a sensor lever configured to rotate corresponding to the travel of a recording medium on the medium transport structure;

a sensor provided on the medium transport structure and configured to detect the rotation of the sensor lever;

a support member rotatably supporting the sensor lever;

a stopper provided at the support member and configured to stop movement of the sensor lever upon the rotation of the sensor lever; and a guide provided at the stopper and inclined with respect to the movement direction of the sensor lever, wherein the guide is inclined with respect to a plane orthogonal to a rotational axis of the sensor lever.

2. The medium detection device according to claim 1, wherein the sensor lever includes a contact section to come in contact with the guide.

3. The medium detection device according to claim 1, further comprising:

a bias member configured to bias the sensor lever toward the stopper.

4. The medium detection device according to claim 1, wherein the guide guides the sensor lever in a direction different from the movement direction of the sensor lever.

5. The medium detection device according to claim 1, wherein an inner acute angle between the movement direction of the sensor lever and the guide is equal or less than 45 degrees.

6. The medium detection device according to claim 1, wherein the guide comprises plural inclined surfaces.

7. The medium detection device according to claim 1, wherein the plural inclined surfaces of the guide comprise:

a first inclined surface tilted with respect to the movement direction of the sensor lever; and a second inclined surface facing the first inclined surface and tilted toward an opposite side to the first inclined surface with respect to the movement direction of the sensor lever.

8. The medium detection device according to claim 1, wherein the sensor lever includes: a rotational shaft being the rotational axis thereof; and a medium contact section to come in contact with the recording medium.

9. The medium detection device according to claim 8, wherein the sensor lever includes, between the rotational shaft and the medium contact section, the contact section to come in contact with the guide.

10. The medium detection device according to claim 8, wherein when the recording medium comes in contact with the medium contact section, the sensor lever rotates away from the guide about the rotational shaft.

11. The medium detection device according to claim 8, wherein one end portion of the sensor lever includes the medium contact section and the other end portion of the sensor lever includes a blocking part to turn on and off the sensor, wherein the sensor detects if the recording medium is in contact with the sensor lever or not by being turned on or off by the blocking part.

12. The medium detection device according to claim 11, wherein the sensor includes a light emitting section to output light and a light receiving section to receive the light output from the light emitting section, and the blocking part blocks the light, when the sensor lever is at a position in the rotational direction of the sensor lever such that the blocking part is between the light emitting section and the light receiving section.

13. The medium detection device according to claim 2, wherein the contact section is formed with a ridge line.

14. The medium detection device according to claim 2, wherein the contact section includes a curved surface.

15. The medium detection device according to claim 2, wherein the contact section is formed with an inclined surface.

16. An image formation apparatus comprising:

the medium detection device according to claim 1; and an image formation section configured to form an image on the recording medium.

17. The medium detection device according to claim 2, wherein the contact section of the sensor level is disposed at a portion of the sensor lever adjacent to the support member.

18. The medium detection device according to claim 1, wherein the stopper comprises an L-shape in cross-section.

19. The medium detection device according to claim 1, wherein the guide is not inclined in a parallel direction with respect to the rotational axis of the sensor lever.

20. The medium detection device according to claim 7, wherein the first inclined surface and the second inclined surface of the guide are angled with respect to each other such that the guide has a substantially triangular shape.

21. The medium detection device according to claim 1, wherein the guide guides a repulsive force upon collision of the sensor lever against the stopper into a direction parallel to the rotational axis of the sensor lever.

22. The medium detection device according to claim 1, wherein the guide includes a guide surface that is inclined with respect to both the rotational axis of the sensor lever and the travel direction of the medium as viewed in a plane that includes both the rotational axis of the sensor lever and the travel direction of the medium.

* * * * *